(12) United States Patent
Sato et al.

(10) Patent No.: US 6,316,557 B1
(45) Date of Patent: Nov. 13, 2001

(54) CATALYSTS FOR THE POLYMERIZATION OF OLEFINS, PROCESS FOR THE PRODUCTION OF OLEFIN POLYMERS, AND PROCESSES FOR THE PRODUCTION OF STYRENE POLYMERS

(75) Inventors: Haruhito Sato, Ichihara; Toshiya Abiko, Tokyo; Satoshi Ikeuchi, Ichihara; Junichi Matsumoto, Ichihara; Harumi Nakashima, Ichihara, all of (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/308,129

(22) PCT Filed: Sep. 17, 1998

(86) PCT No.: PCT/JP98/04183

§ 371 Date: May 14, 1999

§ 102(e) Date: May 14, 1999

(87) PCT Pub. No.: WO99/14247

PCT Pub. Date: Mar. 25, 1999

(30) Foreign Application Priority Data

Sep. 18, 1997 (JP) ..... 9-253717
Sep. 30, 1997 (JP) ..... 9-265253

(51) Int. Cl.$^7$ ............ C08F 4/44; C08F 112/02; B01J 21/16; B01J 31/38
(52) U.S. Cl. ............ 526/128; 526/160; 526/346; 526/347; 526/943; 502/80; 502/104; 502/117; 502/152; 502/232; 502/239
(58) Field of Search ............... 502/80, 84, 102, 502/103, 104, 117, 109, 118; 526/160, 161, 943, 348.6, 347, 128

(56) References Cited

U.S. PATENT DOCUMENTS 5,362,825 * 11/1994 Hawley et al. ............ 526/125
6,087,293 * 7/2000 Carnahan et al. ............ 502/158

FOREIGN PATENT DOCUMENTS

WO 97/20216 * 6/1997 (WO).

* cited by examiner

*Primary Examiner*—David W. Wu
(74) *Attorney, Agent, or Firm*—Oblon, Spivak, McClelland, Maier & Neustadt, P.C.

(57) ABSTRACT

Provided area catalyst for polymerizing olefinic monomers, which comprises (a) a transition metal compound, (b) at least one member selected from clay, clay minerals and ion-exchanging layered compounds, (c) a silane compound, and optionally (d) an alkylating agent; a catalyst for polymerizing olefinic monomers, which comprises (a) a transition metal compound, (b) at least one member selected from clay, clay minerals and ion-exchanging layered compounds, (c) a silane compound, and optionally (e) an organic aluminum compound, and further optionally (d) an alkylating agent; and a method for producing olefinic polymers or styrenic polymers, which comprises homopolymerizing or copolymerizing olefinic or styrenic monomers in the presence of the catalyst for polymerizing olefinic monomers. The method does not require a large amount of aluminoxane, and the catalyst to be used therein has high polymerization activity. Using the catalyst, olefinic polymers and styrenic polymers having high stereospecificity are obtained. The amount of the metallic component remaining in the polymers produced is small, and the polymers have high quality. As being highly efficient, the method is favorable to industrial use.

24 Claims, No Drawings

CATALYSTS FOR THE POLYMERIZATION OF OLEFINS, PROCESS FOR THE PRODUCTION OF OLEFIN POLYMERS, AND PROCESSES FOR THE PRODUCTION OF STYRENE POLYMERS

TECHNICAL FIELD

The present invention relates to a catalyst for polymerizing an olefinic monomer, and a method for producing an olefinic polymer or a styrenic polymer, and precisely, it relates to an efficient and inexpensive method for producing an olefinic polymer and a styrenic polymer.

BACKGROUND ART

Recently, a method has been proposed of using a catalyst comprising a metallocene compound and an aluminoxane for polymerizing olefins in the presence of the catalyst to produce olefin polymers (Japanese Patent Application Laid-Open (JP-A) Sho-58-019309, Hei-2-167307, etc.). It is known that the polymerizing method of using such a catalyst is better than a method of using a conventional Ziegler-Natta catalyst that comprises a titanium or vanadium compound and an organic aluminium compound since the polymerization activity per the transition metal in the former is extremely high and since the former produces polymers having a narrow molecular weight distribution.

Another method has been proposed for polymerizing olefins in the presence of a catalyst that comprises catalytic components of a transition metal compound and an aluminoxane or organic aluminium compound as carried on an inorganic oxide such as silica, alumina or the like (JP-A Sho-61-108610, Hei-1-101303, etc.). However, in order that the methods noted above could have a satisfactory degree of polymerization activity, a large amount of an aluminoxane must be used therein. Therefore, in those methods, the activity per aluminium used is low, and the methods are uneconomical. In addition, since a large amount of aluminium remains in the polymers formed, the methods are further problematic in that the catalyst residue must be removed from the polymers formed therein.

Still another method has been proposed of using clay minerals as catalytic components (JP-A Hei-5-25214, Hei-5-301917, Hei-7-33814). In this method, however, it is said that the clay minerals to be used must be pre-treated with organic aluminium compounds, especially with methylaluminoxane or trimethylaluminium which is extremely expensive and dangerous. In addition, the method is problematic in that the catalyst activity per aluminium therein is not satisfactory and the amount of the catalyst residue that may remain in the products is large.

In particular, the additional problem with the method is that, when styrenic polymers are produced according to the method, the catalyst activity per aluminium is much lower than that in producing other olefins according to it.

The present invention has been made in consideration of the problems noted above, and its object is to provide an efficient and inexpensive method for producing olefinic polymers and also styrenic polymers having a stereospecifically-controlled syndiotactic structure. The method is characterized by using a silane compound, and does not require a large amount of methylaluminoxane or trimethylaluminium which has poor storage stability and is dangerous and which is therefore not easy to handle. In addition, in the method, since the amount of the organic aluminium compound to be used in the total polymerization system can be greatly reduced, the metal component that may remain in the polymers produced is much reduced. Therefore, the polymers produced in the method do not require post-treatment.

DISCLOSURE OF THE INVENTION

We, the present inventors have found that the object mentioned above can be effectively attained by using a polymerization catalyst that comprises specific catalytic components, and have completed the present invention. Specifically, the invention provides the following:

(1) A catalyst for polymerizing olefinic monomers, which comprises (a) a transition metal compound, (b) at least one member selected from clay, clay minerals and ion-exchanging layered compounds, and (c) a silane compound.

(2) The catalyst for polymerizing olefinic monomers of (1), which further contains (d) an alkylating agent.

(3) A catalyst for polymerizing olefinic monomers, which comprises (a) a transition metal compound, (b) at least one member selected from clay, clay minerals and ion-exchanging layered compounds, (c) a silane compound, and (e) an organic aluminum compound.

(4) The catalyst for polymerizing olefinic monomers of (3), which further contains (d) an alkylating agent.

(5) The catalyst for polymerizing olefinic monomers of any one of (1) to (4), wherein the silane compound (c) is represented by a general formula:

$$R_n SiX_{4-n}$$

in which R represents a substituent of which the atom in the site directly bonding to Si is carbon, silicon or hydrogen; X represents a substitutent of which the element in the site directly bonding to Si is halogen, oxygen or nitrogen; plural R's and X's, if any, may be the same or different ones, respectively; and n represents 1, 2 or 3.

(6) The catalyst for polymerizing olefinic monomers of (5), wherein n is 1 or 2.

(7) A method for producing olefinic polymers, which comprises homopolymerizing or copolymerizing olefinic monomers in the presence of the catalyst of any one of (1) to (6).

(8) A method for producing styrenic polymers, which comprises homopolymerizing or copolymerizing styrenic monomers in the presence of the catalyst of any one of (1) to (6).

BEST MODES OF CARRYING OUT THE INVENTION

Embodiments of carrying out the invention are described in detail hereinunder.

1. Constituent Components for the Catalyst for Polymerizing Olefinic Monomers:

Transition Metal Compounds for Component (a):

Various type of transition metal compounds are usable as the component (a) in the invention, for which, however, preferred are compounds of transition metals of Groups IV to VI of the Periodic Table and those of Group VIII. In view of their activity, especially preferred are compounds of transition metals of Groups IV to VI of the following general formula (1) to (3); and those of Group VIII of the following general formula (4).

$$Q^1{}_a(C_5H_{5-a-b}R^1{}_b)(C_5H_{5-a-c}R^2{}_c)M^1X^1{}_pY^1{}_q \qquad (1)$$

$$Q^2{}_a(C_5H_{5-a-d}R^3{}_d)Z^1M^1X^1{}_pY^1{}_q \qquad (2)$$

$$M^1X^2{}_r \qquad (3)$$

$$L^1L^2M^2X^1{}_pY^1{}_q \qquad (4)$$

wherein $Q^1$ represents a bonding group that crosslinks the two conjugated, 5-membered cyclic ligands $(C_5H_{5-a-b}R^1{}_b)$ and $(C_5H_{5-a-c}R^2_c)$; $Q^2$ represents a bonding group that crosslinks the conjugated, 5-membered cyclic ligand $(C_5H_{5-a-d}R^3_d)$ and the group $Z^1$; $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; b, c and d each represent an integer of from 0 to 5 when a=0, or an integer of from 0 to 4 when a=1, or a integer of from 0 to 3 when a=2; (p+q) equals the valence number of $M^1$ minus 2; r equals the valence number of $M^1$; $M^1$ represents a transition metal of Groups IV to VI of the Periodic Table; $M^2$ represents a transition metal of Group VIII of the Periodic Table; $L^1$ and $L^2$ each represent a coordination-bonding ligand; $X^1$, $Y^1$ and $Z^1$ each represent a covalent-bonding or ionic-bonding ligand; $X^2$ represents a covalent-bonding ligand; and $L^1$, $L^2$, $X^1$ and $Y^1$ may be bonded to each other to form a cyclic structure.

Specific examples of $Q^1$ and $Q^2$ include (1) an alkylene group having from 1 to 4 carbon atoms, or a cycloalkylene group, or the group substituted by a lower alkyl or phenyl group at its side chain, such as a methylene group, an ethylene group, an isopropylene group, a methylphenylmethylene group, a diphenylmethylene group, a cyclohexylene group, etc.; (2) a silylene group, or an oligosilylene group, or the group substituted by a lower alkyl or phenyl group at its side chain, such as a silylene group, a dimethylsilylene group, a methylphenylsilylene group, a diphenylsilylene group, a disilylene group, a tetramethyldisilylene group, etc.; and (3) a hydrocarbon group [e.g., a lower alkyl group, a phenyl group, a hydrocarbyloxy group (preferably, a lower alkoxy group), etc.] containing germanium, phosphorus, nitrogen, boron or aluminium, such as a $(CH_3)_2$Ge group, a $(C_6H_5)_2$Ge group, a $(CH_3)_2$P group, a $(C_6H_5)_2$P group, a $(C_4H_9)$N group, a $(C_6H_5)$N group, a $(CH_3)$B group, a $(C_4H_9)$B group, a $(C_6H_5)$B group, a $(C_6H_5)$Al group, a $(CH_3O)$Al group, etc. Of those, preferred are alkylene groups and silylene groups in view of the activity of the intended catalysts. $(C_5H_{5-a-b}R^1_b)$, $(C_5H_{5-a-c}R^2_c)$ and $(C_5H_{5-a-d}R^3_d)$ are conjugated, 5-membered cyclic ligands, in which $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; and b, c and d each represent an integer of from 0 to 5 when a=0, or an integer of from 0 to 4 when a=1, or a integer of from 0 to 3 when a=2. The hydrocarbon group preferably has from 1 to 20 carbon atoms, more preferably from 1 to 12 carbon atoms. The hydrocarbon group may be a mono-valent one that bonds to the cyclopentadienyl group of a conjugated, 5-membered cyclic group. Two of plural hydrocarbon groups, if any, may be bonded to each other to form a cyclic structure along with a part of the cyclopentadienyl group. Specific examples of those conjugated, 5-membered cyclic ligands are substituted or unsubstituted cyclopentadienyl group, indenyl groups and fluorenyl groups. The halogen atom includes chlorine, bromine, iodine and fluorine atoms. The alkoxy group preferably has from 1 to 12 carbon atoms. The silicon-containing hydrocarbon group includes, for example, groups of $-Si(R^4)(R^5)(R^6)$, in which $R^4$, $R^5$ and $R^6$ each represent a hydrocarbon group having from 1 to 24 carbon atoms. As the phosphorus-containing hydrocarbon group, the nitrogen-containing hydrocarbon group and the boron-containing hydrocarbon group, for example, mentioned are groups of $-P(R^7)(R^8)$, $-N(R^7)(R^8)$, and $-B(R^7)(R^8)$, respectively, in which $R^7$ and $R^8$ each represent a hydrocarbon group having from 1 to 18 carbon atoms. Plural $R^1$'s, $R^2$'s and $R^3$'s, if any, may be the same or different ones, respectively. In formula (1), the conjugated, 5-membered cyclic ligands $(C_5H_{5-a-b}R^1_b)$ and $(C_5H_{5-a-c}R^2_c)$ may be the same or different ones.

$M^1$ represents a transition metal element of Groups IV to VI of the Periodic Table, including, for example, titanium, zirconium, hafnium, vanadium, niobium, molybdenum, tungsten, etc. Of those, preferred are titanium, zirconium and hafnium in view of the activity of the intended catalysts. $Z^1$ represents a covalent-bonding ligand, including, for example, a halogen atom, an oxygen atom (—O—), a sulfur atom (—S—), an alkoxy group having from 1 to 20, preferably from 1 to 10 carbon atoms, a thioalkoxy group having from 1 to 20, preferably from 1 to 12 carbon atoms, a nitrogen-containing hydrocarbon group having from 1 to 40, preferably from 1 to 18 carbon atoms, and a phosphorus-containing hydrocarbon group having from 1 to 40, preferably from 1 to 18 carbon atoms. $X^1$ and $Y^1$ each represent a covalent-bonding ligandor an ionic-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group having from 1 to 20, preferably from 1 to 10 carbon atoms, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ maybe the same or different ones. $X^2$ represents a covalent-bonding ligand, including, for example, a halogen atom, a hydrocarbylamino group, or a hydrocarbyloxy group, and is preferably an alkoxy group.

(I) As specific examples of the transition metal compounds of formulae (1) and (2), mentioned are the following compounds.

[1] Transition metal compounds not having a crosslinkable bonding group but having two conjugated, 5-membered cyclic ligands, such as bis(cyclopentadienyl)titanium dichloride, bis(methylcyclopentadienyl)titanium dichloride, bis(dimethylcyclopentadienyl)titanium dichloride, bis(trimethylcyclopentadienyl)titanium dichloride, bis(tetramethylcyclopentadienyl)titanium dichloride, bis(pentamethylcyclopentadienyl)titanium dichloride, bis(n-butylcyclopentadienyl)titanium dichloride, bis(indenyl)titanium dichloride, bis(fluorenyl)titanium dichloride, bis(cyclopentadienyl)titanium chlorohydride, bis(cyclopentadienyl)methyltitanium chloride, bis(cyclopentadienyl)ethyltitanium chloride, bis(cyclopentadienyl)phenyltitanium chloride, bis(cyclopentadienyl)dimethyltitanium, bis(cyclopentadienyl)diphenyltitanium, bis(cyclopentadienyl)dineopentyltitanium, bis(cyclopentadienyl)dihydrotitanium, (cyclopentadienyl)(indenyl)titanium dichloride, (cyclopentadienyl)(fluorenyl)titanium dichloride, bis(cyclopentadienyl)zirconium dichloride, bis(methylcyclopentadienyl)zirconium dichloride, bis(dimethylcyclopentadienyl)zirconium dichloride, bis(trimethylcyclopentadienyl)zirconium dichloride, bis(tetramethylcyclopentadienyl)zirconium dichloride, bis(pentamethylcyclopentadienyl)zirconium dichloride, bis(n-butylcyclopentadienyl)zirconium dichloride, bis(indenyl)

zirconium dichloride, bis(fluorenyl)zirconium dichloride, bis(cyclopentadienyl)zirconium chlorohydride, bis(cyclopentadienyl)methylzirconium chloride, bis(cyclopentadienyl)ethylzirconium chloride, bis(cyclopentadienyl)phenylzirconium chloride, bis(cyclopentadienyl)dimethylzirconium, bis(cyclopentadienyl)diphenylzirconium, bis(cyclopentadienyl)dineopentylzirconium, bis(cyclopentadienyl)dihydrozirconium, (cyclopentadienyl)(indenyl)zirconium dichloride, (cyclopentadienyl)(fluorenyl)zirconium dichloride, etc.

[2] Transition metal compounds having two conjugated, 5-membered cyclic ligands, in which the two ligands are crosslinked with an alkylene group, such as methylenebis(indenyl)titanium dichloride, ethylenebis(indenyl)titanium dichloride, methylenebis(indenyl)titanium chlorohydride, ethylenebis(indenyl)methyltitanium chloride, ethylenebis(indenyl)methoxychlorotitanium, ethylenebis(indenyl)titanium diethoxide, ethylenebis(indenyl)dimethyltitanium, ethylenebis(4,5,6,7-tetrahydroindenyl)titanium dichloride, ethylenebis(2-methylindenyl)titanium dichloride, ethylenebis(2,4-dimethylindenyl)titanium dichloride, ethylenebis(2-methyl-4-trimethylsilylindenyl)titanium dichloride, ethylenebis(2,4-dimethyl-5,6,7-trihydroindenyl)titanium dichloride, ethylene(2,4-dimethylcyclopentadienyl)(3',5'-dimethylcyclopentadienyl)titanium dichloride, ethylene(2-methyl-4-t-butylcyclopentadienyl)(3'-t-butyl-5'-methylcyclopentadienyl)titanium dichloride, ethylene(2,3,5-trimethylcyclopentadienyl)(2',4',5'-trimethylcyclopentadienyl)titanium dichloride, isopropylidenebis(2-methylindenyl)titanium dichloride, isopropylidenebis(indenyl)titanium dichloride, isopropylidenebis(2,4-dimethylindenyl)titanium dichloride, isopropylidene(2,4-dimethylcyclopentadienyl)(3',5'-dimethylcyclopentadienyl)titanium dichloride, isopropylidene(2-methyl-4-t-butylcyclopentadienyl)(3'-t-butyl-5'-methylcyclopentadienyl)titanium dichloride, methylene(cyclopentadienyl)(3,4-dimethylcyclopentadienyl)titanium dichloride, methylene(cyclopentadienyl)(3,4-dimethylcyclopentadienyl)titanium chlorohydride, methylene(cyclopentadienyl)(3,4-dimethylcyclopentadienyl)dimethyltitanium, methylene(cyclopentadienyl)(3,4-dimethylcyclopentadienyl)diphenyltitanium, methylene(cyclopentadienyl)(trimethylcyclopentadienyl)titanium dichloride, methylene(cyclopentadienyl)(tetramethylcyclopentadienyl)titanium dichloride, isopropylidene(cyclopentadienyl)(3,4-dimethylcyclopentadienyl)titanium dichloride, isopropylidene(cyclopentadienyl)(2,3,4,5-tetramethylcyclopentadienyl)titanium dichloride, isopropylidene(cyclopentadienyl)(3-methylindenyl)titanium dichloride, isopropylidene(cyclopentadienyl)(fluorenyl)titanium dichloride, isopropylidene(2-methylcyclopentadienyl)(fluorenyl)titanium dichloride, isopropylidene(2,5-dimethylcyclopentadienyl)(3,4-dimethylcyclopentadienyl)titanium dichloride, isopropylidene(2,5-dimethylcyclopentadienyl)(fluorenyl)titanium dichloride, ethylene(cyclopentadienyl)(3,5-dimethylcyclopentadienyl)titanium dichloride, ethylene(cyclopentadienyl)(fluorenyl)titanium dichloride, ethylene(2,5-dimethylcyclopentadienyl)(fluorenyl)titanium dichloride, ethylene(2,5-diethylcyclopentadienyl)(fluorenyl)titanium dichloride, diphenylmethylene(cyclopentadienyl)(3,4-diethylcyclopentadienyl)titanium dichloride, diphenylmethylene(cyclopentadienyl)(3,4-diethylcyclopentadienyl)titanium dichloride, cyclohexylidene(cyclopentadienyl)(fluorenyl)titanium dichloride, cyclohexylidene(2,5-dimethylcyclopentadienyl)(3',4'-dimethylcyclopentadienyl)titanium dichloride, methylenebis(indenyl)zirconium dichloride, ethylenebis(indenyl)zirconium dichloride, methylenebis(indenyl)zirconium chlorohydride, ethylenebis(indenyl)methylzirconium chloride, ethylenebis(indenyl)methoxychlorozirconium, ethylenebis(indenyl)zirconium diethoxide, ethylenebis(indenyl)dimethylzirconium, ethylenebis(4,5,6,7-tetrahydroindenyl)zirconium dichloride, ethylenebis(2-methylindenyl)zirconium dichloride, ethylenebis(2,4-dimethylindenyl)zirconium dichloride, ethylenebis(2-methyl-4-trimethylsilylindenyl)zirconium dichloride, ethylenebis(2,4-dimethyl-5,6,7-trihydroindenyl)zirconium dichloride, ethylene(2,4-dimethylcyclopentadienyl)(3',5'-dimethylcyclopentadienyl)zirconium dichloride, ethylene(2-methyl-4-t-butylcyclopentadienyl)(3'-t-butyl-5'-methylcyclopentadienyl)zirconium dichloride, ethylene(2,3,5-trimethylcyclopentadienyl)(2',4',5'-trimethylcyclopentadienyl)zirconium dichloride, isopropylidenebis(2-methylindenyl)zirconium dichloride, isopropylidenebis(indenyl)zirconium dichloride, isopropylidenebis(2,4-dimethylindenyl)zirconium dichloride, isopropylidene(2,4-dimethylcyclopentadienyl)(3',5'-dimethylcyclopentadienyl)zirconium dichloride, isopropylidene(2-methyl-4-t-butylcyclopentadienyl)(3'-t-butyl-5'-methylcyclopentadienyl)zirconium dichloride, methylene(cyclopentadienyl)(3,4'-dimethylcyclopentadienyl)zirconium dichloride, methylene(cyclopentadienyl)(3,4-dimethylcyclopentadienyl)zirconium chlorohydride, methylene(cyclopentadienyl)(3,4-dimethylcyclopentadienyl)dimethylzirconium, methylene(cyclopentadienyl)(3,4-dimethylcyclopentadienyl)diphenylzirconium, methylene(cyclopentadienyl)(trimethylcyclopentadienyl)zirconium dichloride, methylene(cyclopentadienyl)(tetramethylcyclopentadienyl)zirconium dichloride, isopropylidene(cyclopentadienyl)(3,4-dimethylcyclopentadienyl)zirconium dichloride, isopropylidene(cyclopentadienyl)(2,3,4,5-tetramethylcyclopentadienyl)zirconium dichloride, isopropylidene(cyclopentadienyl)(3-methylindenyl)zirconium dichloride, isopropylidene(cyclopentadienyl)(fluorenyl)zirconium dichloride, isopropylidene(2-methylcyclopentadienyl)(fluorenyl)zirconium dichloride, isopropylidene(2,5-dimethylcyclopentadienyl)3,4-dimethylcyclopentadienyl)zirconium dichloride, isopropylidene(2,5-dimethylcyclopentadienyl)(fluorenyl)zirconium dichloride, ethylene(cyclopentadienyl)(3,5-dimethylcyclopentadienyl)zirconium dichloride, ethylene(cyclopentadienyl)(fluorenyl)zirconium dichloride, ethylene(2,5-dimethylcyclopentadienyl)(fluorenyl)zirconium dichloride, ethylene(2,5-diethylcyclopentadienyl)(fluorenyl)zirconium dichloride, diphenylmethylene(cyclopentadienyl)(3,4-diethylcyclopentadienyl)zirconium dichloride, diphenylmethylene(cyclopentadienyl)(3,4-diethylcyclopentadienyl)zirconium dichloride, cyclohexylidene(cyclopentadienyl)(fluorenyl)zirconium dichloride, cyclohexylidene(2,5-dimethylcyclopentadienyl)(3',4'-dimethylcyclopentadienyl)zirconium dichloride, methylenebis(indenyl)hafnium dichloride, ethylenebis(indenyl)hafnium dichloride, methylenebis(indenyl)hafnium chlorohydride, ethylenebis(indenyl)methylhafnium chloride, ethylenebis(indenyl)methoxychlorohafnium, ethylenebis(indenyl)hafnium diethoxide, ethylenebis(indenyl)dimethylhafnium, ethylenebis(indenyl)dimethylhafnium, ethylenebis(4,5,6,7-tetrahydroindenyl)

hafniuin dichloride, ethylenebis(2-methylindenyl)hafnium dichloride, ethylenebis(2,4-dimethylindenyl)hafnium dichloride, ethylenebis(2-methyl-4-trimethylsilylindenyl)hafnium dichloride, ethylenebis(2,4-dimethyl-5,6,7-trihydroindenyl)hafnium dichloride, ethylene(2,4-dimethylcyclopentadienyl)(3',5'-dimethylcyclopentadienyl)hafnium dichloride, ethylene(2-methyl-4-t-butylcyclopentadienyl)(3'-t-butyl-5'-methylcyclopentadienyl)hafnium dichloride, ethylene(2,3,5-trimethylcyclopentadienyl)(2',4',5'-trimethylcyclopentadienyl)hafnium dichloride, isopropylidenebis(2-methylindenyl)hafnium dichloride, isopropylidenebis(indenyl)hafnium dichloride, isopropylidenebis(2,4-dimethylindenyl)hafnium dichloride, isopropylidene(2,4-dimethylcyclopentadienyl)(3',5'-dimethylcyclopentadienyl)hafnium dichloride, isopropylidene(2-methyl-4-t-butylcyclopentadienyl)(3'-t-butyl-5'-methylcyclopentadienyl)hafnium dichloride, methylene(cyclopentadienyl)(3,4-dimethylcyclopentadienyl)hafnium dichloride, methylene(cyclopentadienyl)(3,4-dimethylcyclopentadienyl)hafnium chlorohydride, methylene(cyclopentadienyl)(3,4-dimethylcyclopentadienyl)dimethylhafnium, methylene(cyclopentadienyl)(3,4-dimethylcyclopentadienyl)diphenylhafnium, methylene(cyclopentadienyl)(trimethylcyclopentadienyl)hafnium dichloride, methylene(cyclopentadienyl)(tetramethylcyclopentadienyl)hafnium dichloride, isopropylidene(cyclopentadienyl)(3,4-dimethylcyclopentadienyl)hafnium dichloride, isopropylidene(cyclopentadienyl)(2,3,4,5-tetramethylcyclopentadienyl)hafnium dichloride, isopropylidene(cyclopentadienyl)(3-methylindenyl)hafnium dichloride, isopropylidene(cyclopentadienyl)(fluorenyl)hafnium dichloride, isopropylidene(2-methylcyclopentadienyl)(fluorenyl)hafnium dichloride, isopropylidene(2,5-dimethylcyclopentadienyl)(3,4-dimethylcyclopentadienyl)hafnium dichloride, isopropylidene(2,5-dimethylcyclopentadienyl)(fluorenyl)hafnium dichloride, ethylene(cyclopentadienyl)(3,5-dimethylcyclopentadienyl)hafnium dichloride, ethylene(cyclopentadienyl)(fluorenyl)hafnium dichloride, ethylene(2,5-dimethylcyclopentadienyl)(fluorenyl)hafnium dichloride, ethylene(2,5-diethylcyclopentadienyl)(fluorenyl)hafnium dichloride, diphenylmethylene(cyclopentadienyl)(3,4-diethylcyclopentadienyl)hafnium dichloride, diphenylmethylene(cyclopentadienyl)(3,4-diethylcyclopentadienyl)hafnium dichloride, cyclohexylidene(cyclopoentadienyl)(fluorenyl)hafnium dichloride, cyclohexylidene(2,5-dimethylcyclopentadienyl)(3',4'-dimethylcyclopentadienyl)hafnium dichloride, etc.

[3] Transition metal compounds having two silylene-crosslinked conjugated, 5-membered cyclic ligands, such as dimethylsilylenebis(indenyl)titanium dichloride, dimethylsilylenebis(4,5,6,7-tetrahydroindenyl)titanium dichloride, dimethylsilylenebis(2-methylindenyl)titanium dichloride, dimethylsilylenebis(2,4-dimethylindenyl)titanium dichloride, dimethylsilylenebis(2,4-dimethylcyclopentadienyl)(3',5'-dimethylcyclopentadienyl)titanium dichloride, dimethylsilylenebis(2-methyl-4,5-benzoindenyl)titanium dichloride, dimethylsilylenebis(2-methyl-4-naphtylindenyl)titanium dichloride, dimethylsilylenebis(2-methyl-4-phenylindenyl)titanium dichloride, phenylmethylsilylenebis(indenyl)titanium dichloride, phenylmethylsilylenebis(4,5,6,7-tetrahydroindenyl)titanium dichloride, phenylmethylsilylenebis(2,4-dimethylindenyl)titanium dichloride, phenylmethylsilylene(2,4-dimethylcyclopentadienyl)(3',5'-dimethylcyclopentadienyl)titanium dichloride, phenylmethylsilylene(2,3,5-trimethylcyclopentadienyl)(2',4',5'-trimethylcyclopentadienyl)titanium dichloride, phenylmethylsilylenebis(tetramethylcyclopentadienyl)titanium dichloride, diphenylsilylenebis(2,4-dimethylindenyl)titanium dichloride, diphenylsilylenebis(indenyl)titanium dichloride, diphenylsilylenebis(2-methylindenyl)titanium dichloride, tetramethyldisilylenebis(indenyl)titanium dichloride, tetramethyldisilylenebis(cyclopentadienyl)titanium dichloride, tetramethyldisilylene(3-methylcyclopentadienyl)(indenyl)titanium dichloride, dimethylsilylene(cyclopentadienyl)(3,4-dimethylcyclopentadienyl)titanium dichloride, dimethylsilylene(cyclopentadienyl)(trimethylcyclopentadienyl)titanium dichloride, dimethylsilylene(cyclopentadienyl)(tetramethylcyclopentadienyl)titanium dichloride, dimethylsilylene(cyclopentadienyl)(3,4-dimethylcyclopentadienyl)titanium dichloride, dimethylsilylene(cyclopentadienyl)(trimethylcyclopentadienyl)titanium dichloride, dimethylsilylene(cyclopentadienyl)(tetraethylcyclopentadienyl)titanium dichloride, dimethylsilylene(cyclopentadienyl)(fluorenyl)titanium dichloride, dimethylsilylene(cyclopentadienyl)(2,7-di-t-butylfluorenyl)titanium dichloride, dimethylsilylene(cyclopentadienyl)(octahydrofluorenyl)titanium dichloride, dimethylsilylene(2-methylcyclopentadienyl)(fluorenyl)titanium dichloride, dimethylsilylene(2,5-dimethylcyclopentadienyl)(fluorenyl)titanium dichloride, dimethylsilylene(2-ethylcyclopentadienyl)(fluorenyl)titanium dichloride, dimethylsilylene(2,5-diethylcyclopentadienyl)(fluorenyl)titanium dichloride, diethylsilylene(2-methylcyclopentadienyl)(2',7'-di-t-butylfluorenyl)titanium dichloride, dimethylsilylene(2,5-dimethylcyclopentadienyl)(2',7'-di-t-butylfluorenyl)titanium dichloride, dimethylsilylene(2-ethylcyclopentadienyl)(2',7'-di-t-butylfluorenyl)titanium dichloride, dimethylsilylene(diethylcyclopentadienyl)(2,7-di-t-butylfluorenyl)titanium dichloride, dimethylsilylene(methylcyclopentadienyl)(octahydrofluorenyl)titanium dichloride, dimethylsilylene(dimethylcyclopentadienyl)(octahydrofluorenyl)titanium dichloride, dimethylsilylene(ethylcyclopentadienyl)(octahydrofluorenyl)titanium dichloride, dimethylsilylene(diethylcyclopentadienyl)(octahydrofluorenyl)titanium dichloride, dimethylsilylenebis(indenyl)zirconium dichloride, dimethylsilylenebis(4,5,6,7-tetrahydroindenyl)zirconium dichloride, dimethylsilylenebis(2-methylindenyl)zirconium dichloride, dimethylsilylenebis(2,4-dimethylindenyl)zirconium dichloride, dimethylsilylenebis(2,4-dimethylcyclopentadienyl)(3',5'-dimethylcyclopentadienyl)zirconium dichloride, dimethylsilylenebis(2-methyl-4,5-benzoindenyl)zirconium dichloride, dimethylsilylenebis(2-methyl-4-naphtylindenyl)zirconium dichloride, dimethylsilylenebis(2-methyl-4-phenylindenyl)zirconium dichloride, phenylmethylsilylenebis(indenyl)zirconium dichloride, phenylmethylsilylenebis(4,5,6,7-tetrahydroindenyl)zirconium dichloride, phenylmethylsilylenebis(2,4-dimethylindenyl)zirconium dichloride, phenylmethylsilylene(2,4-dimethylcyclopentadienyl)(3',5'-dimethylcyclopentadienyl)zirconium dichloride, phenylmethylsilylene(2,3,5-trimethylcyclopentadienyl)(2',4',5'-trimethylcyclopentadienyl)zirconium dichloride, phenylmethylsilylenebis(tetramethylcyclopentadienyl)

zirconium dichloride, diphenylsilylenebis(2,4-dimethylindenyl)zirconium dichloride, diphenylsilylenebis(indenyl)zirconium dichloride, diphenylsilylenebis(2-methylindenyl)zirconium dichloride, tetramethyldisilylenebis(indenyl)zirconium dichloride, tetramethyldisilylenebis(cyclopentadienyl)zirconium dichloride, tetramethyldisilylene(3-methylcyclopentadienyl)(indenyl)zirconium dichloride, dimethylsilylene(cyclopentadienyl)(3,4-dimethylcyclopentadienyl)zirconium dichloride, dimethylsilylene(cyclopentadienyl)(trimethylcyclopentadienyl)zirconium dichloride, dimethylsilylene(cyclopentadienyl)(tetramethylcyclopentadienyl)zirconium dichloride, dimethylsilylene(cyclopentadienyl)(3,4-diethylcyclopentadienyl)zirconium dichloride, dimethylsilylene(cyclopentadienyl)(trimethylcyclopentadienyl)zirconium dichloride, dimethylsilylene(cyclopentadienyl)(tetraethylcyclopentadienyl)zirconium dichloride, dimethylsilylene(cyclopentadienyl)(fluorenyl)zirconium dichloride, dimethylsilylene(cyclopentadienyl)(2,7-di-t-butylfluorenyl)zirconium dichloride, dimethylsilylene(cyclopentadienyl)(octahydrofluorenyl)zirconium dichloride, dimethylsilylene(2-methylcyclopentadienyl)(fluorenyl)zirconium dichloride, dimethylsilylene(2,5-dimethylcyclopentadienyl)(fluorenyl)zirconium dichloride, dimethylsilylene(2-ethylcyclopentadienyl)(fluorenyl)zirconium dichloride, dimethylsilylene(2,5-diethylcyclopentadienyl)(fluorenyl)zirconium dichloride, diethylsilylene(2-methylcyclopentadienyl)(2',7'-di-t-butylfluorenyl)zirconium dichloride, dimethylsilylene(2,5-dimethylcyclopentadienyl)(2',7'-di-t-butylfluorenyl)zirconium dichloride, dimethylsilylene(2-ethylcyclopentadienyl)(2',7'-di-t-butylfluorenyl)zirconium dichloride, dimethylsilylene(diethylcyclopentadienyl)(2,7-di-t-butylfluorenyl)zirconium dichloride, dimethylsilylene(methylcyclopentadienyl)(octahydrofluorenyl)zirconium dichloride, dimethylsilylene(dimethylcyclopentadienyl)(octahydrofluorenyl)zirconium dichloride, dimethylsilylene(ethylcyclopentadienyl)(octahydrofluorenyl)zirconium dichloride, dimethylsilylene(diethylcyclopentadienyl)(octahydrofluorenyl)zirconium dichloride, dimethylsilylenebis(indenyl)hafnium dichloride, dimethylsilylenebis(4,5,6,7-tetrahydroindenyl)hafnium dichloride, dimethylsilylenebis(2-methylindenyl)hafnium dichloride, dimethylsilylenebis(2,4-dimethylindenyl)hafnium dichloride, dimethylsilylenebis(2,4-dimethylcyclopentadienyl)(3',5'-dimethylcyclopentadienyl)hafnium dichloride, dimethylsilylenebis(2-methyl-4,5-benzoindenyl)hafnium dichloride, dimethylsilylenebis(2-methyl-4-naphtylindenyl)hafnium dichloride, dimethylsilylenebis(2-methyl-4-phenylindenyl)hafnium dichloride, phenylmethylsilylenebis(indenyl)hafnium dichloride, phenylmethylsilylenebis(4,5,6,7-tetrahydroindenyl)hafnium dichloride, phenylmethylsilylenebis(2,4-dimethylindenyl)hafnium dichloride, phenylmethylsilylene(2,4-dimethylcyclopentadienyl)(3',5'-dimethylcyclopentadienyl)hafnium dichloride, phenylmethylsilylene(2,3,5-trimethylcyclopentadienyl)(2',4',5'-trimethylcyclopentadienyl)hafnium dichloride, phenylmethylsilylenebis(tetramethylcyclopentadienyl)hafnium dichloride, diphenylsilylenebis(2,4-dimethylindenyl)hafnium dichloride, diphenylsilylenebis(indenyl)hafnium dichloride, diphenylsilylenebis(2-methylindenyl)hafnium dichloride, tetramethyldisilylenebis(indenyl)hafnium dichloride, tetramethyldisilylenebis(cyclopentadienyl)hafnium dichloride, tetramethyldisilylene(3-methylcyclopentadienyl)(indenyl)hafnium dichloride, dimethylsilylene(cyclopentadienyl)(3,4-dimethylcyclopentadienyl)hafnium dichloride, dimethylsilylene(cyclopentadienyl)(trimethylcyclopentadienyl)hafnium dichloride, dimethylsilylene(cyclopentadienyl)((tetramethylcyclopentadienyl)hafnium dichloride, dimethylsilylene(cyclopentadienyl)(3,4-diethylcyclopentadienyl)hafnium dichloride, dimethylsilylene(cyclopentadienyl)(trimethylcyclopentadienyl)hafnium dichloride, dimethylsilylene(cyclopentadienyl)(tetraethylcyclopentadienyl)hafnium dichloride, dimethylsilylene(cyclopentadienyl)(fluorenyl)hafnium dichloride, dimethylsilylene(cyclopentadienyl)(2,7-di-t-butylfluorenyl)hafnium dichloride, dimethylsilylene(cyclopentadienyl)(octahydrofluorenyl)hafnium dichloride, dimethylsilylene(2-methylcyclopentadienyl)(fluorenyl)hafnium dichloride, dimethylsilylene(2,5-dimethylcyclopentadienyl)(fluorenyl)hafnium dichloride, dimethylsilylene(2-ethylcyclopentadienyl)(fluorenyl)hafnium dichloride, dimethylsilylene(2,5-diethylcyclopentadienyl)(fluorenyl)hafnium dichloride, diethylsilylene(2-methylcyclopentadienyl)(2',7'-di-t-butylfluorenyl)hafnium dichloride, dimethylsilylene(2,5-dimethylcyclopentadienyl)(2',7'-di-t-butylfluorenyl)hafnium dichloride, dimethylsilylene(2-ethylcyclopentadienyl)(2',7'-di-t-butylfluorenyl)hafnium dichloride, dimethylsilylene(diethylcyclopentadienyl)(2,7-di-t-butylfluorenyl)hafnium dichloride, dimethylsilylene(methylcyclopentadienyl)(octahydrofluorenyl)hafnium dichloride, dimethylsilylene(dimethylcyclopentadienyl)(octahydrofluorenyl)hafnium dichloride, dimethylsilylene(ethylcyclopentadienyl)(octahydrofluorenyl)hafnium dichloride, dimethylsilylene(diethylcyclopentadienyl)(octahydrofluorenyl)hafnium dichloride, etc.

[4] Transition metal compounds having two conjugated, 5-membered cyclic ligands, in which the two ligands are crosslinked with a germanium-, aluminium-, boron-, phosphorus- or nitrogen-containing hydrocarbon group, such as dimethylgermylenebis(indenyl)titanium dichloride, dimethylgermylene(cyclopentadienyl)(fluorenyl)titanium dichloride, ethylborylenebis(indenyl)titanium dichloride, phenylalumylenebis(indenyl)titanium dichloride, phenylphosphylenebis(indenyl)titanium dichloride, ethylborylenebis(indenyl)titanium dichloride, phenylalumylenebis(indenyl)titanium dichloride, phenylalumylene(cyclopentadienyl)(fluorenyl)titanium dichloride, dimethylgermylenebis(indenyl)zirconium dichloride, dimethylgermylene(cyclopentadienyl)(fluorenyl)zirconium dichloride, ethylborylenebis(indenyl)zirconium dichloride, phenylalumylenebis(indenyl)zirconium dichloride, phenylphosphylenebis(indenyl)zirconium dichloride, ethylborylenebis(indenyl)zirconium dichloride, phenylalumylenebis(indenyl)zirconium dichloride, phenylalumylene(cyclopentadienyl)(fluorenyl)zirconium dichloride, dimethylgermylenebis(indenyl)hafnium dichloride, dimethylgermylene(cyclopentadienyl)(fluorenyl)hafnium dichloride, ethylborylenebis(indenyl)hafnium dichloride, phenylalumylenebis(indenyl)hafnium dichloride, phenylphosphylenebis(indenyl)hafnium dichloride, ethylborylenebis(indenyl)hafnium dichloride, phenylalumylenebis(indenyl)hafnium dichloride, phenylalumylene(cyclopentadienyl)(fluorenyl)hafnium dichloride, etc.

[5] Transition metal compounds having one conjugated, 5-membered cyclic ligand, such as pentamethylcyclopentadienyl-bis(phenyl)aminotitanium dichloride, indenyl-bis(phenyl)aminotitanium dichloride, pentamethylcyclopentadienyl-bis(trimethylsilyl) aminotitanium dichloride, pentamethylcyclopentadienylphenoxytitanium dichloride, dimethylsilylene (tetramethylcyclopentadienyl)-t-butylaminotitanium dichloride, dimethylsilylene(tetramethylcyclopentadienyl) phenylaminotitanium dichloride, dimethylsilylene (tetrahydroindenyl)decylaminotitanium dichloride, dimethylsilylene(tetrahydroindenyl)[bis(trimethylsilyl) amino]titanium dichloride, dimethylgermylene (tetramethylcyclopentadienyl)phenylaminotitanium dichloride, pentamethylcyclopentadienyltitanium trimethoxide, pentamethylcyclopentadienyltitanium trichloride, pentamethylcyclopentadienyl-bis(phenyl) aminozirconium dichloride, indenyl-bis(phenyl) aminozirconium dichloride, pentamethylcyclopentadienyl-bis(trimethylsilyl)aminozirconium dichloride, pentamethylcyclopentadienylphenoxyzirconium dichloride, dimethylsilylene(tetramethylcyclopentadienyl)-t-butylaminozirconium dichloride, dimethylsilylene (tetramethylcyclopentadienyl)phenylaminozirconium dichloride, dimethylsilylene(tetrahydroindenyl) decylaminozirconium dichloride, dimethylsilylene (tetrahydroindenyl)[bis(trimethylsilyl)amino]zirconium dichloride, dimethylgermylene (tetramethylcyclopentadienyl)phenylaminozirconium dichloride, pentamethylcyclopentadienylzirconium trimethoxide, pentamethylcyclopentadienylzirconium trichloride, pentamethylcyclopentadienyl-bis(phenyl) aminohafnium dichloride, indenyl-bis(phenyl) aminohafnium dichloride, pentamethylcyclopentadienyl-bis(trimethylsilyl)aminohafnium dichloride, pentamethylcyclopentadienylphenoxyhafnium dichloride, dimethylsilylene(tetramethylcyclopentadienyl)-t-butylaminohafnium dichloride, dimethylsilylene (tetramethylcyclopentadienyl)phenylaminohafnium dichloride, dimethylsilylene(tetrahydroindenyl) decylaminohafnium dichloride, dimethylsilylene (tetrahydroindenyl)[bis(trimethylsilyl)amino]hafnium dichloride, dimethylgermylene (tetramethylcyclopentadienyl)phenylaminohafnium dichloride, pentamethylcyclopentadienylhafnium trimethoxide, pentamethylcyclopentadienylhalnium trichloride, etc.

[6] Transition metal compounds having two conjugated, 5-membered cyclic ligands in which the ligands are double-crosslinked, such as(1,1'-dimethylsilylene)(2,2'-isopropylidene)-bis(cyclopentadienyl)titanium dichloride, (1,1'-dimethylsilylene)(2,2'-dimethylsilylene)-bis (cyclopentadienyl)titanium dichloride, (1,1'-dimethylsilylene)(2,2'-isopropylidene)-bis (cyclopentadienyl)dimethyltitanium, (1,1'-dimethylsilylene) (2,2'-isopropylidene)-bis(cyclopentadienyl) dibenzyltitanium, (1,1'-dimethylsilylene)( 2,2'-isopropylidene)-bis(cyclopentadienyl)bis(trimethylsilyl) titanium, (1,1'-dimethylsilylene)(2,2'-isopropylidene)-bis (cyclopentadienyl)bis(trimethylsilylmethyl)titanium, (1,2'-dimethylsilylene)(2,1'-ethylene)-bis(indenyl)titanium dichloride, (1,1'-dimethylsilylene)(2,2'-ethylene)-bis (indenyl)titanium dichloride, (1,1'-ethylene)(2,2'-dimethylsilylene)-bis(indenyl)titanium dichloride, (1,1'-dimethylsilylene)(2,2'-cyclohexylidene)-bis(indenyl) titanium dichloride, (1,1'-dimethylsilylene)(2,2'-isopropylidene)-bis(cyclopentadienyl)zirconium dichloride, (1,1'-dimethylsilylene)(2,2'-dimethylsilylene)-bis (cyclopentadienyl)zirconium dichloride, (1,1'-dimethylsilylene)(2,2'-isopropylidene)-bis (cyclopentadienyl)dimethylzirconium, (1,1'-dimethylsilylene)(2,2'-isopropylidene)-bis (cyclopentadienyl)dibenzylzirconium, (1,1'-dimethylsilylene)(2,2'-isopropylidene)-bis (cyclopentadienyl)bis(trimethylsilyl)zirconium, (1,1'-dimethylsilylene)(2,2'-isopropylidene)-bis (cyclopentadienyl)bis(trimethylsilylmethyl)zirconium, (1,2'-dimethylsilylene)(2,1'-ethylene)-bis(indenyl) zirconium dichloride, (1,1'-dimethylsilylene)(2,2'-ethylene)-bis(indenyl)zirconium dichloride, (1,1'-ethylene)( 2,2'-dimethylsilylene)-bis(indenyl)zirconium dichloride, (1,1'-dimethylsilylene)(2,2'-cyclohexylidene)-bis(indenyl) zirconium dichloride, (1,1'-dimethylsilylene)(2,2'-isopropylidene)-bis(cyclopentadienyl)hafnium dichloride, (1,1'-dimethylsilylene)(2,2'-dimethylsilylene)-bis (cyclopentadienyl)hafnium dichloride, (1,1'-dimethylsilylene)(2,2'-isopropylidene)-bis (cyclopentadienyl)dimethylhafnium, (1,1'-dimethylsilylene) (2,2'-isopropylidene)-bis(cyclopentadienyl) dibenzylhafnium, (1,1'-dimethylsilylene)(2,2'-isopropylidene)-bis(cyclopentadienyl)bis(trimethylsilyl) hafnium, (1,1'-dimethylsilylene)(2,2'-isopropylidene)-bis (cyclopentadienyl)bis(trimethylsilylmethyl)hafnium, (1,2'-dimethylsilylene)(2,1'-ethylene)-bis(indenyl)hafnium dichloride, (1,1'-dimethylsilylene)(2,2'-ethylene)-bis (indenyl)hafnium dichloride, (1,1'-ethylene)(2,2'-dimethylsilylene)-bis(indenyl)hafnium dichloride, (1,1'-dimethylsilylene)(2,2'-cyclohexylidene)-bis(indenyl) hafnium dichloride, etc.

[7] Derivatives from compounds of [1] to [6] noted above, which are produced by substituting the chlorine atoms in those compounds of [1] to [6] with any of a bromine atom, an iodine atom, a hydrogen atom, a methyl group, a phenyl group, a benzyl group, a methoxy group, a dimethylamino group and the like.

[8] Of the compounds of [1] to [7] noted above, transition metal compounds having one conjugated, 5-membered cyclic ligand described in [5] are particularly preferred in producing styrenic polymers.

(II) As specific examples of the transition metal compounds of formula (3), mentioned are the following compounds.

Tetra-n-butoxytitanium, tetra-i-propoxytitanium, tetraphenoxytitanium, tetracresoxytitanium, tetrachlorotitanium, tetrakis(diethylamino)titanium, tetrabromotitanium, as well as their derivatives as produced by substituting the titanium atom in those compounds with zirconium or hafnium. Of those transition metal compounds, preferred are alkoxytitanium compounds, alkoxyzirconium compounds, and alkoxyhafnium compounds.

(III) In the transition metal compounds of formula (4), $M^2$ represents a transition metal of Group (VIII) of the Periodic Table. Concretely, it includes iron, cobalt, nickel, palladium, platinum, etc. Of those, preferred are nickel and palladium. $L^1$ and $L^2$ each represents a coordination-bonding ligand; and $X^1$ and $Y^1$ each represent a covalent-bonding or ionic-bonding ligand. As mentioned hereinabove, $X^1$ and $Y^1$ include, for example, a hydrogen atom, a halogen atom, a hydrocarbon atom having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ may be the same or different ones. Specific examples of $L^1$ and $L^2$ include triphenylphosphine, acetonitrile, benzonitrile, 1,2-bisdiphenylphosphinoethane, 1,3-bisdiphenylphosphinopropane, 1,1'-bisdiphenylphosphinoferrocene, cyclooctadiene, pyridine, bistrimethylsilylaminobistrimethylsilyliminophosphorane, etc.

$L^1$, $L^2$, $X^1$ and $Y^1$ may be bonded to each other to form a cyclic structure.

Specific examples of the transition metal compounds of formula (4) include dibromobistriphenylphosphine nickel, dichlorotriphenylphosphine nickel, dibromodiacetonitrile nickel, dibromodibenzonitrile nickel, dibromo(1,2-bisdiphenylphosphinoethane)nickel, dibromo(1,3-bisdiphenylphosphinopropane)nickel, dibromo(1,1'-diphenylbisphosphinoferrocene)nickel, dimethylbistriphenylphosphine nickel, dimethyl(1,2-bisdiphenylphosphinoethane)nickel, methyl(1,2-bisdiphenylphosphinoethane)nickel tetrafluoroborate, (2-diphenylphosphino-1-phenylethyleneoxy)phenylpyridine nickel, dichlorobistriphenylphosphine palladium, dichlorodibenzonitrile palladium, dichlorodiacetonitrile palladium, dichloro(1,2-bisdiphenylphosphinoethane)palladium, bistriphenylphosphine palladium bistetrafluoroborate, bis(2,2'-pyridine)methyliron tetrafluoroborate etherate, etc.

Of those, preferred are cationic complexes such as methyl (1,2-bisdiphenylphosphinoethane)nickel tetrafluoroborate, bistriphenylphosphine palladium bistetrafluoroborate, and bis(2,2'-pyridino)methyliron tetrafluoroborate etherate.

As the component (a) in the catalyst of the invention, one or more transition metal compounds noted above may be used either singly or as combined.

Component (b):

[1] Clay or clay minerals:

Clay or clay minerals may be used as the component (b). Clay is an aggregate of fine hydrous silicate minerals. It is plastic when kneaded with a suitable amount of water, and is rigid when dried. When baked at high temperatures, it is sintered. Clay minerals are hydrous silicates which are the essential components constituting clay.

These are not limited to only natural ones, but synthetic products of those substances are employable herein.

[2] Ion-exchanging layered compounds:

As the component (b), also usable are ion-exchanging layered compounds, which are characterized by the crystal structure of such that a plurality of crystal planes formed through ionic bonding or the like are laminated in parallel layers via weak bonding force between the adjacent layers, and in which the ions are exchangeable. Some clay minerals are ion-exchanging layered compounds.

For example, phyllosilicic acid compounds belong to clay minerals. Phyllosilicic acid compounds include phyllosilicic acid and phyllosilicates. As natural phyllosilicates, known are montmorillonite, saponite and hectorite of smectite family; illite and sericite of mica family; and mixed layer minerals of smectites and micas, or those of micas and vermiculites.

As synthetic products, known are fluoro-tetrasilicon mica, laponite, smectone, etc.

Also mentioned are ion-exchanging compounds having a layered crystal structure, such as α-$Zr(HPO_4)_2$, γ-$Zr(HPO_4)_2$, α-$Ti(HPO_4)_2$, γ-$Ti(HPO_4)_2$, etc. These are not clay minerals.

Examples of clay and clay minerals which do not belong to ion-exchanging layered compounds and which are usable as the component (b) include clay having a low montmorillonite content and referred to as bentonite; kibushi clay comprising montmorillonite and many other components; gairome clay; sepiolite and palygorskite having a fibrous morphology; and amorphous or low-crystalline allophane, imogolite, etc.

The component (b) is contacted with the silane compound (c) and optionally the alkylating agent (d), and it is desirable that clay, clay minerals and ion-exchanging layered compound for the component (b) are chemically treated for the purpose of removing impurities from them or for modifying their structures and functions.

The chemical treatment referred to herein indicates both the surface treatment to remove impurities from surfaces and the treatment to modify the crystal structure of clay. Concretely, it includes acid treatment, alkali treatment, salt treatment, organic treatment, etc.

The acid treatment is to remove impurities from surfaces, while releasing cations such as aluminum, iron, magnesium and the like from crystal structures to thereby enlarge surface areas. The alkali treatment is to destroy the crystal structure of clay, thereby modifying the structure of clay. The salt treatment and the organic treatment are to form ionic complexes, molecular complexes, organic complexes, etc., whereby surface areas and layer-to-layer spaces may be changed. Owing to their ion-exchanging ability, the interlayer exchangeable ions in the compounds may be exchanged with any other bulky ions to give layered substances having enlarged interlayer spaces.

[3] The substances of the component (b) noted above may be directly used as they are, or, if desired, additional water may be adsorbed onto them, or they may be heated and dehydrated prior to being used.

[4] As the component (b), preferred are clay and clay minerals in view of their activity. Most preferred are phyllosilicic acid compounds, of which smectite is desirable, and montmorillonite is more desirable.

Silane compounds for component (c):

As comprising a silane compound, the catalyst of the invention has higher activity. As the silane compounds for the component (c), preferred are those of the following general formula (5):

$$R_nSiX_{4-n} \qquad (5)$$

wherein R represents a substituent of which the atom in the site directly bonding to Si is carbon, silicon or hydrogen; X represents a substituent of which the element in the site directly bonding to Si is halogen, oxygen or nitrogen; plural R's and X's, if any, may be the same or different ones, respectively; and n represents 1, 2 or 3.

Compounds of formula (5) include bis-silyl compounds, $X_{4-n}Si(CH_2)_mSiX_{4-n}$ (where m is from 1 to 10; and n is 1, 2 or 3) having plural Si's in the molecule, and also polynuclear polysiloxanes, polysilazanes, etc. The substituent R includes an alkyl group, a phenyl group, a silyl group, and a hydride group, and is preferably an alkyl group. More preferred is an alkyl group not having an aromatic unit. The substituent X includes a halide, a hydroxide, an alkoxide and an amide, and is preferably a halide. Most preferred is a chloride. Specific examples of the silane compounds include trialkylsilyl chlorides such as trimethylsilyl chloride, triethylsilyl chloride, triisopropylsilyl chloride, t-butyldimethylsilyl chloride, t-butyldiphenylsilyl chloride, phenethyldimethylsilyl chloride, etc.; dialkylsilyl dichlorides such as dimethylsilyl dichloride, diethylsilyl dichloride, diisopropylsilyl dichloride, di-n-hexylsilyl dichloride, dicyclohexylsilyl dichloride, docosylmethylsilyl dichloride, bis(phenethyl)silyl dichloride, methylphenethylsilyl dichloride, diphenylsilyl dichloride, dimethylsilyl dichloride, ditolylsilyl dichloride, etc.; alkylsilyl trichlorides such as methylsilyl trichloride, ethylsilyl trichloride, isopropylsilyl trichloride, dodecylsilyl trichloride, phenylsilyl trichloride, mesitylsilyl trichloride, tolylsilyl trichloride, phenethylsilyl trichloride, etc.; other halides to be derived from the compounds noted above by substituting the chloride moiety with any other halogens; disilazanes such as bis(trimethylsilyl)amide, bis(triethylsilyl)amide, bis(triisopropylsilyl)amide, bis(dimethylethylsilyl)amide, bis(diethylmethylsilyl)amide, bis(dimethylphenylsilyl)amide, bis(dimethyltolyl)amide, bis(dimethylmesityl)amide, etc.; trialkylsilyl hydroxides such as trimethylsilyl hydroxide, triethylsilyl hydroxide, triisopropylsilyl hydroxide, tert-butyldimethylsilyl hydroxide, phenethyldimethylsilyl hydroxide, etc.; polysilanols generally referred to as peralkylpolysiloxypolyols; bissilyls such as bis(methyldichlorosilyl)methane, 1,2-bis(methyldichlorosilyl)ethane, bis(methyldichlorosilyl)octane, bis(triethoxysilyl)ethane, etc.; and silane hydrides such as dimethylchlorosilane, (N,N-dimethylamino)dimethylsilane, diisobutylchlorosilane, etc. Of the compounds of formula (5), preferred are those where n is 1 or 2. One of the compounds may be used as the component (c). As the case may be, however, two or more of the compounds may be used, as combined in any desired manner.

Alkylating agents for component (d):

In the present invention, optionally used is an alkylating agent as the component (d) for the catalyst. The alkylating agent, if used, may further improve the activity of the catalyst. Various types of alkylating agents are known. For example, employable herein as alkylating agents are alkyl-having aluminum compounds of a general formula (6):

$$R^9{}_m Al(OR^{10})_n X_{3-m-n} \quad (6)$$

wherein $R^9$ and $R^{10}$ each represent an alkyl group having from 1 to 8, preferably from 1 to 4 carbon atoms; X represents a hydrogen atom or a halogen atom; $0<m\leq 3$, preferably m=2 or 3, most preferably m=3; $0\leq n<3$, preferably n=0 or 1;

alkyl-having magnesium compounds of a general formula (7):

$$R^9{}_2 Mg \quad (7)$$

wherein $R^9$ has the same meaning as above;
and alkyl-having zinc compounds of a general formula (8):

$$R^9{}_2 Zn \quad (8)$$

wherein $R^9$ has the same meaning as above.

Of those alkyl-having compounds, preferred are alkyl-having aluminum compounds, especially trialkylaluminium and dialkylaluminium compounds. As the preferred compounds, concretely mentioned are trialkylaluminiums such as trimethylaluminium, triethylaluminium, tri-n-propylaluminium, triisopropylaluminium, tri-n-butylaluminium, triisobutylaluminium, tri-t-butylaluminium, etc.; dialkylaluminium halides such as dimethylaluminium chloride, diethylaluminium chloride, di-n-propylaluminium chloride, diisopropylaluminium chloride, di-n-butylaluminium chloride, diisobutylaluminium chloride, di-t-butylaluminium chloride, etc.; dialkylaluminium alkoxides such as dimethylaluminium methoxide, dimethylaluminium ethoxide, etc.; dialkylaluminium hydrides such as dimethylaluminium hydride, diethylaluminium hydride, diisobutylaluminium hydride, etc. Also mentioned are dialkylmagnesiums such as dimethylmagnesium, diethylmagnesium, di-n-propylmagnesium, diisopropylmagnesium, dibutylmagnesium, butylethylmagnesium, etc.; dialkylzincs such as dimethylzinc, diethylzinc, ethyl-n-propylzinc, diisopropylzinc, etc.

Organic Aluminum Compounds for Component (e):

In the present invention, further optionally used is an organic aluminum compound as the component (e) for the catalyst. The organic aluminum compound, if used, may further improve the activity of the catalyst. As preferred examples of the organic aluminum compound for use in the invention, mentioned are alkyl-having aluminum compounds of the following general formula (9), linear alumoxanes of the following general formula (10), cyclic alumoxanes of the following general formula (11), and their mixtures.

$$R^9{}_m Al(OR^{10})_n X_{3-m-n} \quad (9)$$

wherein $R^9$ and $R^{10}$ each represent an alkyl group having from 1 to 8, preferably from 1 to 4 carbon atoms; X represents a hydrogen atom or a halogen atom; $0<m\leq 3$, preferably m=2 or 3, most preferably m=3; $0\leq n<3$, preferably n=0 or 1.

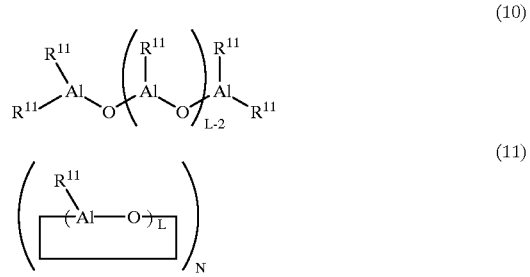

wherein $R^{11}$ represents an alkyl group having from 1 to 20, preferably from 1 to 8 carbon atoms, and plural $R^{11}$'s, if any, may be the same or different ones; L is an integer falling within the range of $2\leq L\leq 40$, preferably $2\leq L\leq 30$; and N is an integer falling within the range of $1\leq N\leq 50$.

As the preferred compounds, concretely mentioned are trialkylaluminiums such as trimethylaluminium, triethylaluminium, tripropylaluminium, triisobutylaluminium, tri-t-butylaluminium, etc.; halogen- or alkoxy-having alkylaluminiums such as dimethylaluminium chloride, diethylaluminium chloride, dimethylaluminium methoxide, diethylaluminium methoxide, etc.; alumoxanes such as methylalumoxane, ethylalumoxane, isobutylalumoxane, etc. Of those, especially preferred is triisobutylaluminium.

2. Method for Preparing Catalyst:

(1) How to Mix the Constituent Components:

The means of mixing the constituent components to prepare the catalyst of the invention is not specifically defined. For example, the components may be mixed in the manner mentioned below.

For the Invention of Claims 1 and 2:

Where the components (a), (b) and (c) are used for preparing the catalyst, for example, employable are [1] a method of contacting the component (a) with the component (b) followed by adding the component (c) to the resulting mixture; [2] a method of contacting the component (a) with the component (c) followed by adding the component (b) to the resulting mixture; [3] a method of contacting the component (b) with the component (c) followed by adding the component (a) to the resulting mixture; and [4] a method of contacting the three components all together at the same time. Of those, preferred is the method [2] of contacting the component (b) with the component (c) followed by adding the component (a) to the resulting mixture.

Where the component (d) is used in addition to the three components noted above, the means of mixing them is not specifically defined. Preferably, as in the methods [1] to [4] noted above, a mixture of the component (a) and the component (d) is further mixed with a mixture of the component (b) and the component (c).

While or after the constituent components are mixed together, a polymer such as polyethylene, polypropylene, polystyrene or the like, and even a solid inorganic oxide such as silica, alumina or the like may be present in the mixing system or may be added to the mixture for the catalyst.

For the Invention of Claims 3 and 4:

Where the components (a), (b), (c) and (e) are used for preparing the catalyst, for example, employable are [1 a method of contacting the component (a) with the component (b) followed by adding the component (c) and the component (e) to the resulting mixture; [2] a method of contacting the components (a), (c) and (e) together followed by adding the component (b) to the resulting mixture; [3] a method of contacting the component (b) with the components (c) and (e) followed by adding the component (a) to the resulting mixture; and [4] a method of contacting the four components all together at the same time. Of those, preferred is the method [3] of contacting the component (b) with the components (c) and (e) followed by adding the component (a) to the resulting mixture.

Where the component (d) is used in addition to the four components noted above, the means of mixing them is not specifically defined. Preferably, a mixture of the component (a) and the component (d) is further mixed with a mixture of the component (b), the component (c) and the component (e).

While or after the constituent components are mixed together, a polymer such as polyethylene, polypropylene, polystyrene or the like, and even a solid inorganic oxide such as silica, alumina or the like may be present in the mixing system or may be added to the mixture for the catalyst.

(2) Ratio of Constituent Components:

For the Invention of Claims 1 and 2:

It is desirable the constituent components are so contacted together that the molar number of the metal atom in the transition metal complex of the component (a) and the molar number of the silicon atom in the silane compound of the component (c) could be from 0.0001 to 0.5, and from 0.001 to 1000, respectively, more preferably from 0.001 to 0.2, and from 0.01 to 100, respectively, relative to 1 kg of the component (b) of any of clay, clay minerals and ion-exchanging layered compounds. If the molar number of the transition metal is smaller than 0.0001, the polymerization activity of the catalyst is low. But if larger than 0.5, the polymerization activity of the catalyst relative to the transition metal unit is extremely low. If the molar number of the silane compound is lower than 0.001, the polymerization activity of the catalyst is low. But if larger than 1000, the activity is also low. Where the catalyst additionally contains the alkylating agent of the component (d), the amount of the alkylating agent in the catalyst will vary depending on the type and the amount of the polymerization solvent to be used. Preferably, the molar ratio of the component (d) to the transition metal in the component (a) may fall from 0 to 10000/1 (but exclusive of 0). If the molar ratio is larger than 10000, the activity of the catalyst relative to the amount of the component (d) will be low.

For the Invention of Claims 3 and 4:

It is desirable the constituent components are so contacted together that the molar number of the metal atom in the transition metal complex of the component (a), the molar number of the silicon atom in the silane compound of the component (c) and the molar number of the aluminum atom in the organic aluminum compound of the component (e) could be from 0.0001 to 0.5, from 0.001 to 1000, and from 0.1 to 1000, respectively, more preferably from 0.001 to 0.2, from 0.01 to 100, and from 1 to 100, respectively, relative to 1 kg of the component (b) of any of clay, clay minerals and ion-exchanging layered compounds. If the molar number of the transition metal is smaller than 0.0001, the polymerization activity of the catalyst is low. But if larger than 0.5, the polymerization activity of the catalyst relative to the transition metal unit is extremely low. If the molar number of the silane compound is lower than 0.001, the polymerization activity of the catalyst is low. But if larger than 1000, the activity is also low. If the amount of the organic aluminum compound (e) to be contacted with the composition comprising the components (b) and (c) is smaller than 0.01, the polymerization activity of the catalyst could not be satisfactorily improved. But even if larger than 1000, such a large amount of the component (e) would no more contribute to further improving the activity of the catalyst. Where the catalyst additionally contains the alkylating agent of the component (d), the amount of the alkylating agent in the catalyst will vary depending on the type and the amount of the polymerization solvent to be used. Preferably, the molar ratio of the component (d) to the transition metal in the component (a) may fall from 0 to 10000/1 (but exclusive of 0). If the molar ratio is larger than 10000, the activity of the catalyst relative to the amount of the component (d) will be low.

(3) Conditions for Contacting Constituent Components:

The constituent components may be contacted together in a hydrocarbon such as pentane, hexane, heptane, toluene, xylene or the like, in an inert atmosphere such as nitrogen or the like. The temperature for the contact may fall between −30° C. and the boiling point of the solvent used, but preferably falls between room temperature and the boiling point of the solvent used.

3. Production of Olefinic Polymers and Styrenic Polymers:

Olefinic polymers can be produced by homopolymerizing or copolymerizing olefinic monomers in the presence of the catalyst noted above of the invention. Styrenic polymers can also be produced by homopolymerizing or copolymerizing olefinic monomers in the presence of the catalyst. The copolymerization includes copolymerization of two or more different types of olefinic monomers, copolymerization of two or more different types of styrenic monomers, and copolymerization of styrenic monomers and olefinic monomers, by which are produced copolymers.

(1) Monomers to be Used:

Olefinic monomers for use in the invention include, for example, α-olefins such as ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-hexene, 5-methyl-1-hexene, 3,3-dimethyl-1- pentene, 3,4-dimethyl-1-pentene, 4,4-dimethyl-1-pentene, vinylcyclohexane, etc.; dienes such as 1,3-butadiene, 1,4-butadiene, 1,5-hexadiene, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc. Styrenic monomers for use in the invention include, for example, styrene; alkylstyrenes such as p-methylstyrene, p-ethylstyrene, p-propylstyrene, p-isopropylstyrene, p-butylstyrene, p-t-butylstyrene, p-phenyistyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; as well as trimethylsilylstyrene, vinylbenzoates, divinylbenzene, etc.

(2) Polymerization Conditions:

The polymerization may be effected in the absence or presence of a solvent. The solvent may include, for example, hydrocarbons such as butane, pentane, hexane, toluene, cyclohexane, etc.; and liquefied α-olefins. The temperature for the polymerization may fall between −50° C. and 250° C. The pressure for it is not specifically defined, but preferably falls between normal pressure and 2000 kgf/cm². Hydrogen may be present in the polymerization system, which acts as a molecular weight-controlling agent.

(3) Styrenic Polymers:

Styrenic polymers having a high-degree syndiotactic structure in the styrene chain moiety may be produced in the method of using the catalyst of the invention. The high-degree syndiotactic structure referred to herein for the styrene chain moiety in the styrenic polymers produced is meant to indicate that the stereochemical structure of the styrenic polymers has a high degree of syndiotacticity, in which the side chains of phenyl groups or substituted phenyl groups are positioned alternately in the opposite sites relative to the main chain composed of carbon—carbon bonds. The degree of tacticity of the polymers may be determined through nuclear magnetic resonance with an isotopic carbon ($^{13}$C-NMR).The degree of tacticity to be determined through this method is represented by the ratio of continuous plural constituent units existing in polymers. For example, diad indicates 2 units; triad indicates 3 units; and pentad indicates 5 units. The "styrenic polymers having a syndiotactic structure" as referred to herein are meant to indicate polystyrenes having a degree of syndiotacticity of such that the racemidiad proportion is not smaller than 75%, preferably not smaller than 85%, or the racemipentad proportion is not smaller than 30%, preferably not smaller than 50%, as well as their mixtures, and copolymers consisting essentially of such polystyrenes.

EXAMPLES

The invention is concretely described hereinunder with reference to the following Examples, which, however, are not intended to restrict the scope of the invention. The intrinsic viscosity [η], the stereospecificity [mmmm], the stereospecificity [rrrr] and the melting point Tm that are referred to hereinunder were obtained according to the methods mentioned below.

Intrinsic Viscosity [η]:

A sample was dissolved in decalin, and its intrinsic viscosity was measured at 130° C. For the measurement, samples of syndiotactic polystyrenes were dissolved in 1,2,4-trichlorobenzene.

Stereospecificity [mmmm]:

A polymer sample was dissolved in a mixed solvent of 1,2,4-trichlorobenzene and deutrated benzene (90/10, by volume), and subjected to a proton complete decoupling method for $^{13}$C-NMR (using Nippon Electronics' LA-500) at 130° C. Based on the signals for the methyl group obtained in the method, the stereospecificity [mmmm] of the sample was determined. The stereospecificity was proposed by A. Zambelli et al. in "Macromolecules, 6, 925 (1973)", and it indicates the isotactic fraction in the pentad unit of a polypropylene molecular chain as measured in $^{13}$C nuclear magnetic resonance spectrometry. For the attribution of the peaks seen in the $^{13}$C nuclear magnetic resonance spectrometry, referred to was the A. Zambelli et al's proposal in "Macromolecules, 8, 688 (1975)".

Stereospecificity [rrrr]:

This was determined according to the method described in JP-A Sho-62-104818.

Melting Point Tm:

The melting point of each sample was measured, using a differential scanning calorimeter of Perkin Elmer's DSC-7 Model.

EXAMPLES OF INVENTION OF CLAIMS 1 AND 2

Example 1 (production of polyethylene)

(1) Chemical Treatment of Clay Mineral:

40 g of a commercial product of montmorillonite (Kunipia F, manufactured by Kunimine Industry Co.) was ground in a grinder for 4 hours. 20 g of the powdered montmorillonite was put into a three-neck separable flask having a capacity of 500 ml, and dispersed in 100 ml of deionized water containing 20 g of magnesium chloride 6-hydrate dissolved therein. This was stirred at 90° C. for 0.5 hours. After having been thus processed, the solid residue was washed with water. This treatment was repeated once again. Thus was obtained magnesium chloride-processed montmorillonite. Next, this was dispersed in 160 ml of an aqueous solution of 6% HCl, and stirred under reflux for 2 hours. After having been thus processed, this was washed with water through repeated filtration until the filtration wash became neutral, and then dried. Thus was obtained chemical-treated montmorillonite.

(2) Contact with Silane Compound:

1.0 g of the chemical-treated montmorillonite that had been prepared in (1) (this had a water content of 15% by weight; the water content was obtained from the weight loss after dehydration under heat at 150° C. for 1 hour, and the same shall apply hereinunder) was put into a Schlenk's tube having a capacity of 300 ml, and dispersed in 25 ml of toluene to obtain a slurry, to which was added 1.13 g (5.2 mmols) of methylphenethylsilyl dichloride. The resulting slurry was stirred at room temperature for 60 minutes, then heated, and reacted at 100° C. for 1 hour. After the reaction, the supernatant was removed from the reaction mixture, and the remaining solid phase was washed with 200 ml of toluene. This washing filtration was repeated once again. Next, toluene was again added to the thus-washed slurry to be 50 ml in total. This was processed in the next step.

(3) Contact with Transition Metal Compound:

50 ml of the slurry that had been prepared in (2) was put into a Schlenk's tube having a capacity of 300 ml, to which was added 100 μmols of zirconocene dichloride at room temperature, and stirred for 0.5 hours at the temperature. After the reaction mixture was left static for a while, the supernatant was removed from it, and the remaining residue was washed with 200 ml of toluene. Toluene was again added to the thus-washed residue to prepare a catalyst slurry of being 50 ml in volume.

(4) Polymerization of Ethylene:

400 ml of toluene, 0.5 mmols of triisobutylaluminium, and 5 ml (corresponding to 0.1 g of the solid catalyst) of the catalyst slurry that had been prepared in the previous step (3) were put into a 1.6 liter autoclave in that order, and heated at 70° C. After this was kept at the temperature for 5 minutes, ethylene was continuously fed thereinto to have a pressure of 5 kg/cm$^2$, and polymerized for 30 minutes. Next, methanol was added to this to stop the polymerization. The polymer thus produced was taken out through filtration, and dried at 90° C. under reduced pressure for 12 hours. The polymer thus obtained weighed 52.5 g. The polymerization activity per the catalyst used was 1050 g/g-catalyst/hr.

Example 2 (production of polyethylene)

(1) Chemical Treatment of Clay Mineral:

This is the same as in (1) in Example 1.

(2) Contact with Silane Compound:

This was effected in the same manner as in (2) in Example 1, except that 5.2 mmols of phenethylsilane trichloride was used in place of methylphenethylsilane dichloride.

(3) Contact with Transition Metal Compound:

This is the same as in (3) in Example 1.

(4) Polymerization of Ethylene:

This was effected in the same manner as in (4) in Example 1, except that thepolymerization time was 15 minutes. In this, obtained was 45.0 g of a polymer. The polymerization activity per the catalyst used was 1800 g/g-catalyst/hr.

Comparative Example 1 (production of polyethylene)

(1) Chemical Treatment of Clay Mineral:

This is the same as in (1) in Example 1.

(2) Contact with Transition Metal Compound:

This was effected in the same manner as in (3) in Example 1, except that 1 g of the clay having been processed in the previous step (1), in place of the silane-processed clay in (3) in Example 1, was suspended in 50 ml of toluene to prepare the catalyst slurry.

(3) Polymerization of Ethylene:

This was effected in the same manner as in (4) in Example 1, but no polymer was produced herein.

Example 3 (production of polypropylene)

(1) Chemical Treatment of Clay Mineral:

This is the same as in (1) in Example 1.

(2) Contact with Silane Compound:

This is the same as in (2) in Example 1.

(3) Polymerization or Propylene:

400 ml of toluene and 2.0 mmols of triisobutylaluminium were put into a 6 liter autoclave, and heated at 75° C. Next, 1 μmol of dimethylsilylenebis(2-methyl-4,5-benzoindenyl) zirconium dichloride was put thereinto, and kept stirred at the temperature for 2 minutes. Next, 5 ml (corresponding to 0.1 g of the solid catalyst) of the catalyst slurry that had been prepared in the previous step (2) was added thereto, and heated up to 80° C. Then, propylene was continuously fed thereinto to have a pressure of 7 kg/cm$^2$, and polymerized for 30 minutes. Next, methanol was added to this to stop the polymerization. The polymer thus produced was taken out through filtration, and dried at 90° C. under reduced pressure for 3 hours. The polymer thus obtained weighed 27.1 g. The polymerization activity per the transition metal in the catalyst used was 594 kg/g-Zr/hr. This polymer had Tm=138° C., [η]=0.94, and [mmmm]=83%. This was isotactic-structured polypropylene.

EXAMPLES OF INVENTION OF CLAIMS 3 AND 4

Example 4 (production of polyethylene)

(1) Chemical Treatment of Clay Mineral:

40 g of a commercial product of montmorillonite (Kunipia F, manufactured by Kunimine Industry Co.) was ground in a grinder for 4 hours. 19.9 g of the powdered montmorillonite was put into a four-neck flask having a capacity of 500 ml, and dispersed in 100 ml of deionized water containing 20 g of magnesium chloride 6-hydrate dissolved therein. This was stirred at 90° C. for 0.5 hours. After having been thus processed, the solid residue was washed with water. This treatment was repeated once again. Thus was obtained magnesium chloride-processed montmorillonite. Next, this was dispersed in 160 ml of an aqueous solution of 6% HCl, and stirred under reflux for 2 hours. After having been thus processed, this was washed with water until the supernatant became neutral, and then dried. Thus was obtained chemical-treated montmorillonite.

(2) Contact with Silane Compound and Organic Aluminum:

1.0 g of the chemical-treated montmorillonite that had been prepared in (1) (this had a water content of 15% by weight; the water content was obtained from the weight loss after dehydration under heat at 150° C. for 1 hour, and the same shall apply hereinunder) was put into a Schlenk's tube having a capacity of 300 ml, and further dehydrated at room temperature under reduced pressure for 30 minutes. Next, this was dispersed in 50 ml of toluene added thereto to prepare a slurry, to which was added 3 ml (24 mmols) of trimethylsilyl chloride, and heated at 90° C. with stirring for 30 minutes. Next, while this was still kept at 90° C., 3 ml (24 mmols) of trimethylsilyl chloride was gradually added thereto over a period of 10 minutes, and further heated for 30 minutes. After the reaction, this was cooled to room temperature, and washed twice with 200 ml of toluene. Next, 100 μmols of triisobutylaluminium was added thereto, stirred at room temperature for 30 minutes, and then kept static for a while. The resulting solid residue was washed twice with 200 ml of toluene, and 50 ml of toluene was added to the thus-washed residue. Thus was obtained a trimethylsilyl chloride and triisobutylaluminium-processed montmorillonite slurry.

(3) Preparation of Transition Metal Compound-carrying Catalyst:

To the slurry obtained in the previous step (2), added was 100 μmols of zirconocene, and stirred at room temperature for 30 minutes. After the resulting mixture was kept static for a while, the supernatant was removed, and the remaining residue was washed twice with 200 ml of toluene. Then, toluene was added to the thus-washed residue to prepare 50 ml of a catalyst slurry.

(4) Polymerization of Ethylene:

400 ml of toluene, 0.2 mmols of trasobutylaluminium, and 5 ml (corresponding to 0.1 g of the solid catalyst) of the catalyst slurry that had been prepared in the previous step (3) were put into a 1.6 liter autoclave in that order, and heated at 70° C. After this was kept at the temperature for 5 minutes, ethylene was continuously fed thereinto to have a pressure of 5 g/cm², and polymerized for 30 minutes. Next, methanol was added to this to stop the polymerization. The polymer thus produced was taken out through filtration, and dried at 90° C. under reduced pressure for 12 hours. The polymer thus obtained weighed 19 g. The polymerization activity per the catalyst used was 380 g/g-catalyst/hr.

Example 5 (production of polyethylene)

(1) Chemical Treatment of Clay Mineral:
This is the same as in (1) in Example 4.

(2) Contact with Silane Compound and Organic Aluminum:
1.0 g of the chemical-treated montmorillonite that had been prepared in (1) (this had a water content of 15% by weight; the water content was obtained from the weight loss after dehydration under heat at 150° C. for 1 hour, and the same shall apply hereinunder) was put into a Schlenk's tube having a capacity of 300 ml, and dispersed in 25 ml of toluene to prepare a slurry. With stirring, 0.95 g of silanol-silicone (trade name of DMS-S12, manufactured by Asmax Co.—this had a molecular weight of from 400 to 700) was added to the slurry.

After the addition, the slurry was reacted at room temperature for 60 minutes, then heated, and further reacted at 80° C. for 1 hour. Next, this was cooled to room temperature, to which was added 200 ml of toluene. After the resulting mixture was kept static for a while, the supernatant was removed through filtration. The washing filtration was repeated once again. Next, to the thus-washed slurry, added was 25 ml of a toluene solution of triisobutylaluminium (0.5 mol/liter), and heated at 100° C. for 1 hour. The resulting mixture was washed twice with 200 ml of toluene, and toluene was added to the washed mixture to prepare a slurry of being 50 ml in total volume. This was processed in the next step.

(3) Contact with Transition Metal Compound:
50 ml of the slurry that had been prepared in (2) was put into a Schlenk's tube having a capacity of 300 ml, to which was added 100 µmols of zirconocene dichloride at room temperature, and stirred for 0.5 hours at the temperature. After the reaction mixture was left static for a while, the supernatant was removed from it, and the remaining residue was washed three times with 200 ml of toluene. 50 ml of toluene was again added to the thus-washed residue to prepare a catalyst slurry.

(4) Polymerization of Ethylene:
Using the catalyst that had been prepared in the previous step (3), ethylene was polymerized in the same manner as in (4) in Example 4. As a result, obtained was 76 g of a polymer. The polymerization activity per the catalyst used was 1520 g/g-catalyst/hr.

Example 6 (production of polyethylene)

(1) Chemical Treatment of Clay Mineral:
This is the same as in (1) in Example 4.

(2) Chemical Treatment with Silane Compound and Organic Aluminum:
This was effected in the same manner as in (2) in Example 5, except that 1.13 g (5.2 mmols) of methylphenethylsilyl dichloride was used in place of silanol-silicone.

(3) Contact with Transition Metal Compound:
This is the same as in (3) in Example 5.

(4) Polymerization of Ethylene:
This was effected in the same manner as in (4) in Example 4, except that the polymerization time was 15 minutes. In this, obtained was 57 g of a polymer. The polymerization activity per the catalyst used was 2270 g/g-catalyst/hr.

Comparative Example 2 (production of polyethylene)

(1) Chemical Treatment of Clay Mineral:
This is the same as in (1) in Example 4.

(2) Contact with Organic Aluminum Compound:
1.0 g of the chemical-treated montmorillonite that had been prepared in (1) (this had a water content of 15% by weight; the water content was obtained from the weight loss after dehydration under heat at 150° C. for 1 hour, and the same shall apply hereinunder) was put into a Schlenk's tube having a capacity of 300 ml, and dispersed in 25 ml of toluene to obtain a slurry, to which was added 25 ml of a toluene solution of 0.5 mols of triisobutyl aluminum, and reacted. After the reaction, the supernatant was removed from the reaction mixture, and the remaining solid phase was washed with toluene. Next, 50 ml of toluene was added to the thus-washed residue to prepare a slurry. This was processed in the next step.

(3) Preparation of Transition Metal Compound-carrying Catalyst:
This is the same as in (3) in Example 5.

(4) Polymerization of Ethylene:
This was effected in the same manner as in (4) in Example 4. As a result, obtained was 7 g of a polymer. The polymerization activity per the catalyst used was 140 g/g-catalyst/hr.

Example 7 (production or polypropylene)

(1) Chemical Treatment of Clay Mineral:
This is the same as in (1) in Example 4.

(2) Contact with Silane Compound and Organic Aluminum:
This is the same as in (2) in Example 6.

(3) Polymerization of Propylene:
400 ml of toluene and 2.0 mmols of triisobutylaluminium were put into a 1.6 liter autoclave, and heated at 75° C. Next, 1 µmol of dimethylsilylenebis(2-methyl-4,5-benzoindenyl) zirconium dichloride was put thereinto, and kept stirred at the temperature for 2 hours. Next, 5 ml (corresponding to 0.1 g of the solid catalyst) of the catalyst slurry that had been prepared in the previous step (2) was added thereto, and heated up to 80° C. Then, propylene was continuously fed thereinto to have a pressure of 7 kg/cm², and polymerized for 20 minutes. Next, methanol was added to this to stop the polymerization. The polymer thus produced was taken out through filtration, and dried at 90° C. under reduced pressure for 3 hours. The polymer thus obtained weighed 79.9 g. The polymerization activity per the transition metal in the catalyst used was 2630 kg/g-Zr/hr. This polymer had Tm=139° C., [η]=0.84, and [mmmm]=85%. This was isotactic-structured polypropylene.

Example 8 (production of ethylene/butene copolymer)

(1) Chemical Treatment of Clay Mineral:
This is the same as in (1) in Example 4.

(2) Contact with Silane Compound and Organic Aluminum:
This is the same as in (2) in Example 5.

(3) Contact with Transition Metal Compound:
5 ml of the slurry (concentration: 1 g/50 ml) that had been prepared in (2) and 1 ml of a toluene solution of tetramethylcyclopentadienyldimethylsilyl-t-butylamidotitanium dichloride (concentration: 40 µmols/ml) were successively put into a Schlenk's tube having a capacity of 50 ml at room temperature, and then stirred at the temperature for 1 hour. The resulting mixture was kept static for a while, and the supernatant was removed from it. The remaining residue was washed three times with 10 ml of toluene. Finally, the supernatant was removed, and hexane was added to the residue to prepare a slurry having a total volume of 10 ml. ICP analysis of the slurry revealed that the amount of titanium carried therein was 1.6 mg/g-carrier.

(4) Copolymerization of Ethylene/butene:
400 ml of toluene, 2 mmols of triisobutylaluminium, and 5 ml (corresponding to 0.05 g of the solid catalyst) of the Ti-carrying catalyst slurry prepared previously were put into a 1 liter autoclave in that order, to which was added 1.5 g of 1-butene at 70° C. while introducing ethylene thereinto under a pressure of 0.6 megapascals. Ethylene was continuously introduced into the autoclave to ensure the constant pressure in the polymerization system, and the polymerization was continued for 30 minutes. Methanol was added to this to stop the polymerization.

The polymer thus produced was taken out through filtration, and dried at 90° C. under reduced pressure for 12 hours. The polymer thus obtained weighed 13 g. The polymerization activity of the catalyst used was 325 kg/g-Ti/hr. $^{13}$C-NMR analysis of the polymer revealed that the butene content of the polymer was 2.5% by weight. The polymer had a limiting viscosity [η] of 14.5 (dl/g).

Comparative Example 3 (production of ethylene-butene copolymer)

Catalyst preparation and polymerization was effected in the same manner as in Example 4, except that 5 mmols of $SiO_2$-carried MAO(methylaluminoxane) was used in place of the clay mineral and that the amount of the transition metal compound used as the essential. catalyst component was 10 μmols. The polymer obtained herein weighed 19 g, and had a limiting viscosity [η] of 8.13 and a butene content of 5.0% by weight. The polymerization activity of the catalyst used was 79.4 kg/g-Ti/hr.

Example 9 (product-on of ethylene/norbornene copolymer)

Polymerization was effected in the same manner as in Example 8, except that 3 g of norbornene was used in place of 1.5 g of 1-butene. The polymer obtained herein weighed 8 g, and had a norbornene content of 1.2% by weight. The polymerization activity of the catalyst used was 200 kg/g-Ti/hr.

Example 10 (production of syndiotactic polystyrene)
(1) Chemical Treatment of Clay Mineral:
   This is the same as in (1) in Example 4.
(2) Treatment with Silane Compound and Organic Aluminum:
   This is the same as in (2) in Example 6.
(3) Contact with Transition Metal Compound:
   13.4 ml of toluene, 0.25 ml (0.5 mmols) of a toluene solution of triisobutylaluminium (concentration: 2 mols/liter), 6.0 ml of the slurry prepared in (2), and 0.4 ml (0.02 mmols) of a toluene solution of pentamethylcyclopentadienyltitanium trimethoxide (concentration: 50 mmols/liter) were successively put into a 50 ml Schlenk's tube at room temperature, and stirred for 1.5 hours at the temperature to prepare a catalyst slurry.
(4) Production of Syndiotactic Polystyrene:
   10 ml of styrene and 0.01 ml (0.005 mmols) of a toluene solution of triisobutylaluminium (concentration: 0.5 mols/liter) were put into a 30 ml ampoule bottle, in a nitrogen-charged box. This ampoule bottle was set in an oil bath at 70° C. After 10 minutes, 1.25 ml of the catalyst slurry prepared in the previous step (3) was put into the bottle. The monomer was polymerized at 70° C. for 1 hour, and then the bottle was taken out of the oil bath. Methanol was added to this to stop the polymerization. The polymer thus produced was taken out of the ampoule bottle, dipped overnight in methanol, and then dried at 200° C. in vacuum for 2 hours. The yield of the polymer was 0.468 g. The polymerization activity of the catalyst used was 7.8 kg-polymer/g-Ti. The limiting viscosity [η] of the polymer (in trichlorobenzene at 135° C.) was 1.68 dl/g. $^{13}$C-NMR analysis of the polymer revealed that the polymer was syndiotactic polystyrene having a degree of tacticity [rrrr] for the racemipentad fraction of 84%. Tm of the polymer was 266° C.

Example 11 (production of syndiotactic polystyrene)
(1) Chemical Treatment of Clay Mineral:
   This is the same as in (1) in Example 4.
(2) Contact with Organic Aluminum:
   This was effected in the same manner as in (2) in Example 6, except that trimethylaluminium was used as the organic aluminum for the treatment in place of triisobutylaluminium.
(3) Contact with Transition Metal Compound:
   This was effected in the same manner as in (3) in Example 10, except that the slurry prepared in the previous (2) was used in place of the slurry prepared in (3) in Example 10.
(4) Production of Syndiotactic Polystyrene:
   Styrene was polymerized in the same manner as in (4) in Example 10, except that the catalyst slurry prepared in the previous (3) was used. The yield of the polymer produced herein was 0.091 g. The polymerization activity of the catalyst used was 1.5 kg-polymer/g-Ti. The limiting viscosity [η] of the polymer (in trichlorobenzene at 135° C.) was 1.63 dl/g. $^{13}$C-NMR analysis of the polymer revealed that the polymer was syndiotactic polystyrene having a degree of tacticity [rrrr] for the racemipentad fraction of 82%. Tm of the polymer was 264° C.

Example 12 (production of polypropylene)
(1) Chemical-treated Clay A:
   20 g of montmorillonite (Kunipia F, manufactured by Kunimine Industry Co.) was put into a three-neck separable flask having a capacity of 500 ml, and dispersed in 100 ml of deionized water containing 20 g of magnesium chloride 6-hydrate dissolved therein. This was stirred at 90° C. for 0.5 hours. After having been thus processed, the solid residue was washed with water. This treatment was repeated once again. Thus was obtained magnesium chloride-processed montmorillonite. Next, this was dispersed in 160 ml of an aqueous solution of 6% HCl, and stirred under reflux for 1 hour. After having been thus processed, this was washed with water through repeated filtration until the filtrationt wash became neutral, and was finally filtered under suction pressure.

The resulting clay slurry was dried at room temperature in vacuum for 18 hours. Thus was obtained a chemical-treated clay. The chemical-treated clay had a water content of 15%. To measure its water content, the dried, chemical-treated clay was put into a muffle furnace, heated up to 150° C. over a period 30 minutes, and kept at the temperature for 1 hour. From the weight loss in the thus heat-treated clay, the water content of the clay was obtained.
(2) Contact with Silane Compound and Organic Aluminum:
   1.0 g of the chemical-treated clay A (having a water content of 15% by weight) and 50 ml of toluene were put into a Schlenk's tube having a capacity of 300 ml to prepare a clay slurry. While the clay slurry was stirred, 0.96 g (3.6 mmols) of di-n-hexylsilyl dichloride [$(CH_3(CH_2)_5)_2SiCl_2$] was gradually and dropwise added thereto over a period of 15 minutes. After the addition, this was stirred in a nitrogen stream atmosphere at room temperature for 3 days. Next, this was heated at 100° C. for 1 hour, and then washed twice with 200 ml of toluene. To the resulting slurry, added was 25 ml of a toluene solution of truisobutylaluminium (0.5 mols/liter), heated at 100° C. for 1 hour, and then washed twice with 200 ml of toluene. Toluene was added to this to make it have a total volume of 50 ml. Thus was obtained fine clay slurry A.

(3) Contact with Transition Metal Compound:

0.2 ml of a toluene solution of dimethylsilylenebis(2-methyl-4,5-benzoindenyl)zirconium dichloride (1 μmol/ml) was added to 5 ml of the clay slurry A at room temperature, and stirred at the temperature for 0.5 hours. Thus was prepared 5.2 ml of catalyst preparation A.

(4) Polymerization of Propylene:

400 ml of toluene and 1.0 mmol of triisobutylaluminium were put into a 1.6 liter autoclave, and heated at 70° C. After this was kept at the temperature for 5 minutes, 5.2 ml (containing 0.1 g of clay) of the catalyst preparation A that had been prepared in the previous step (3) was added thereto, and propylene was continuously fed into the autoclave to have a pressure of 5 kg/cm$^2$, and polymerized for 20 minutes. Next, methanol was added to this to stop the polymerization. The polymer thus produced was taken out through filtration, and dried at 90° C. under reduced pressure for 12 hours. The polymer thus obtained weighed 73 g. The polymerization activity per the catalyst used was 2190 g/g-catalyst/hr. The activity per the zirconium metal was 1.2 tons/g-Zr/hr.

Example 13 (production of polypropylene)

(1) Modification with Silane Compound:

Silane treatment was effected in the same manner as in (2) in Example 12, except that 1.1 g (4.1 mmols) of dicyclohexylsilyl dichloride was used in place of 0.96 g (3.6 mmols) of di-n-hexylsilyl dichloride [$(CH_3(CH_2)_5)_2SiCl_2$]. Thus prepared herein was 50 ml of clay slurry B.

(2) Contact with Transition Metal Compound:

0.2 ml of a toluene solution of dimethylsilylenebis(2-methyl-4,5-benzoindenyl)zirconium dichloride (1 μmol/ml) was added to 5 ml of the clay slurry B at room temperature, and stirred at the temperature for 0.5 hours. Thus was prepared 5.2 ml of catalyst preparation B.

(3) Polymerization or Propylene:

Propylene was polymerized for 14 minutes in the same manner as in (4) in Example 12, except that 5.2 ml (containing 0.1 g of clay) of the catalyst preparation B prepared in the previous step (2) was used. The polymer obtained herein weighed 48 g. The polymerization activity per the catalyst used was 2050 g/g-catalyst/hr. The activity per the zirconium metal was 1.1 tons/g-Zr/hr.

Example 14 (production of polypropylene)

(1) Contact with Silane Compound and Organic Aluminum Compound:

Silane treatment was effected in the same manner as in (2) in Example 12, except that 1.3 g (4.3 mmols) of dodecylsilyl trichloride [$CH_3(CH_2)_{11}SiCl_3$] was used in place of 0.96 g (3.6 mmols) of di-n-hexylsilyl dichloride [$(CH_3(CH_2)_5)_2SiCl_2$]. Thus prepared herein was 50 ml of clay slurry C.

(2) Contact with Transition Metal Compound:

0.2 ml of a toluene solution of dimethylsilylenebis(2-methyl-4,5-benzoindenyl)zirconium dichloride (1 μmol/ml) was added to 5 ml of the clay slurry C at room temperature, and stirred at the temperature for 0.5 hours. Thus was prepared 5.2 ml of catalyst preparation C.

(3) Polymerization or Propylene:

Propylene was polymerized for 20 minutes in the same manner as in (4) in Example 12, except that 5.2 ml (containing 0.1 g of clay) of the catalyst preparation C prepared in the previous step (2) was used. The polymer obtained herein weighed 51 g. The polymerization activity per the catalyst used was 1530 g/g-catalyst/hr. The activity per the zirconium metal was 0.8 tons/g-Zr/hr.

Example 15 (production of polypropylene)

(1) Contact with Silane Compound and Organic Aluminum:

Silane treatment was effected in the same manner as in (2) in Example 12, except that 1.0 g (2.4 mmols) of docosylmethylsilyldichloride [$CH_3(CH_2)_{21}CH_3SiCl_2$] was used in place of 0.96 g (3.6 mmols) of di-n-hexylsilyl dichloride [$(CH_3(CH_2)_5)_2SiCl_2$]. Thus prepared herein was 50 ml of clay slurry D.

(2) Contact with Transition Metal Compound:

0.2 ml of a toluene solution of dimethylsilylenebis(2-methyl-4,5-benzoindenyl)zirconium dichloride (1 μmol/ml) was added to 5 ml of the clay slurry D at room temperature, and stirred at the temperature for 0.5 hours. Thus was prepared 5.2 ml of catalyst preparation D.

(3) Polymerization or Propylene:

Propylene was polymerized for 14 minutes in the same manner as in (4) in Example 12, except that 5.2 ml (containing 0.1 g of clay) of the catalyst preparation D prepared in the previous step (2) was used. The polymer obtained herein weighed 42 g. The polymerization activity per the catalyst used was 1780 g/g-catalyst/hr. The activity per the zirconium metal was 1.0 ton/g-Zr/hr.

Example 16 (production of polypropylene)

(1) Contact with Silane Compound and Organic Aluminum:

Silane treatment was effected in the same manner as in (2) in Example 12, except that 1.1 g (8.5 mmols) of dimethylsilyl dichloride [$(CH_3)_2SiCl_2$] was used in place of 0.96 g (3.6 mols) of di-n-hexylsilyl dichloride [$(CH_3(CH_2)_5)_2SiCl_2$]. Thus prepared herein was 50 ml of clay slurry E.

(2) Contact with Transition Metal Compound:

0.2 ml of a toluene solution of dimethylsilylenebis(2-methyl-4,5-benzoindenyl)zirconium dichloride (1 μmol/ml) was added to 5 ml of the clay slurry E at room temperature, and stirred at the temperature for 0.5 hours. Thus was prepared 5.2 ml of catalyst preparation E.

(3) Polymerization or Propylene:

Propylene was polymerized for 30 minutes in the same manner as in (4) in Example 12, except that 5.2 ml (containing 0.1 g of clay) of the catalyst preparation E prepared in she previous step (2) was used. The polymer obtained herein weighed 65 g. The polymerization activity per the catalyst used was 1300 g/g-catalyst/hr. The activity per the zirconium metal was 0.7 tons/g-Zr/hr.

Comparative Example 4 (production of polypropylene)

(1) Contact with Silane Compound and Organic Aluminum Compound:

Silane treatment was effected in the same manner as in (2) in Example 12, except that 1.4 g (8.2 mmols) of tetrachlorosilane [$SiCl_4$] was used in place of 0.96 g (3.6 mmols) of di-n-hexylsilyl dichloride [$(CH_3(CH_2)_5)_2SiCl_2$]. Thus prepared herein was 50 ml of clay slurry F.

(2) Contact with Transition Metal Compound:

0.2 ml of a toluene solution of dimethylsilylenebis(2-methyl-4,5-benzoindenyl)zirconium dichloride (1 μmol/ml) was added to 5 ml of the clay slurry F at room temperature, and stirred at the temperature for 0.5 hours. Thus was prepared 5.2 ml of catalyst preparation F.

(3) Polymerization or Propylene:

Propylene was polymerized for 30 minutes in the same manner as in (4) in Example 12, except that 5.2 ml (containing 0.1 g of clay) of the catalyst preparation F prepared in the previous step (2) was used. The polymer obtained herein weighed 25 g. The polymerization activity per the catalyst used was 500 g/g-catalyst/hr. The activity per the zirconium metal was 0.3 tons/g-Zr/hr.

INDUSTRIAL APPLICABILITY

In the present invention, a large amount of methylaluminoxane, which is not easy to handle as having poor storage stability and being dangerous, is not used, and, in addition, the amount of the organic aluminum to be used in the entire polymerization system is much reduced. Therefore, the polymers produced do not contain a large amount of metallic residues remaining therein, and do not require post treatment. Olefinic polymers and styrenic polymers are obtained efficiently and inexpensively according to the invention.

What is claimed is:

1. A catalyst for polymerizing olefinic monomers, which comprises:

(a) a transition metal compound represented by formula (1) or (2):

$$Q^1{}_a(C_5H_{5-a-b}R^1{}_b)(C_5H_{5-a-c}R^2{}_c)M^1X^1{}_pY^1{}_q \quad (1)$$

$$Q^2{}_a(C_5H_{5-a-d}R^3{}_d)Z^1M^1X^1{}_pY^1{}_q \quad (2)$$

wherein $Q^1$ represents a bonding group that crosslinks two conjugated, 5-membered cyclic ligands, $C_5H_{5-a-b}R^1{}_b$ and $C_5H_{5-a-c}R^2{}_c$; $Q^2$ represents a bonding group that crosslinks the conjugated, 5-membered cyclic ligand, $C_5H_{5-a-d}R^3{}_d$, and the group $Z^1$; $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $M^1$ represents a transition metal of Groups IV to VI of the Periodic Table; $X^1$, $Y^1$ and $Z^1$ each represents a covalent-bonding or ionic-bonding ligand; a is 0, 1 or 2; with the provisos:

1) when a=0, b, c and d each is 0 or an integer of 1 to 5;
   2) when a=1, b, c and d each is 0 or an integer of 1 to 4;
   3) when a=2, b, c and d each is 0 or an integer of 1 to 3;

p+q equals the valence of $M^1$ minus 2; and $X^1$ and $Y^1$ may be bonded to each other to form a cyclic structure;

(b) at least one member selected from the group consisting of clay, clay minerals and ion-exchanging layered compounds; and (c) a silane compound.

2. The catalyst for polymerizing olefinic monomers of claim 1, further containing (d) an alkylating agent.

3. The catalyst for polymerizing olefinic monomers of claim 1, wherein the silane compound (c) is represented by the formula:

$$R_nSiX_{4-n}$$

wherein R represents a substituent bonding to Si through carbon, silicon or hydrogen present in R; X represents a substituent bonding to Si through halogen, oxygen or nitrogen present in X; n represents 1, 2 or 3; and a plurality of R substituents or X, if any, may be the same of different from each other.

4. The catalyst for polymerizing olefinic monomers of claim 3, wherein n is 1 or 2.

5. A method for producing olefinic polymers, which comprises:
   homopolymerizing or copolymerizing olefinic monomers in the presence of the catalyst as defined in claim 1.

6. A method for producing styrenic polymers, which comprises:
   homopolymerizing or copolymerizing styrenic monomers in the presence of the catalyst as defined in claim 1.

7. A catalyst for polymerizing olefinic monomers, which comprises:

(a) a transition metal compound represented by formula (1) or (2):

$$Q^1{}_a(C_5H_{5-a-b}R^1{}_b)(C_5H_{5-a-c}R^2{}_c)M^1X^1{}_pY^1{}_q \quad (1)$$

$$Q^2{}_a(C_5H_{5-a-d}R^3{}_d)Z^1M^1X^1{}_pY^1{}_q \quad (2)$$

wherein $Q^1$ represents a bonding group that crosslinks two conjugated, 5-membered cyclic ligands, $C_5H_{5-a-b}R^1{}_b$ and $C_5H_{5-a-c}R^2{}_c$; $Q^2$ represents a bonding group that crosslinks the conjugated, 5-membered cyclic ligand, $C_5H_{5-a-d}R^3{}_d$, and the group $Z^1$; $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $M^1$ represents a transition metal of Groups IV to VI of the Periodic Table; $X^1$ and $Y^1$ each represents a covalent-bonding or ionic-bonding ligand; a is 0, 1 or 2; with the provisos:

1) when a=0, b, c and d each is 0 or an integer of 1 to 5;
   2) when a=1, b, c and d each is 0 or an integer of 1 to 4;
   3) when a=2, b, c and d each is 0 or an integer of 1 to 3;

p+q equals the valence of $M^1$ minus 2; and $X^1$ and $Y^1$ may be bonded to each other to form a cyclic structure;

(b) at least one member selected from the group consisting of clay, clay minerals and ion-exchanging layered compounds;

(c) a silane compound; and (e) an organic aluminum compound.

8. The catalyst for polymerizing olefinic monomers of claim 7, further containing (d) an alkylating agent.

9. The catalyst for polymerizing olefinic monomers of claim 7, wherein the silane compound (c) is represented by the formula:

$$R_nSiX_{4-n}$$

wherein R represents a substituent bonding to Si through carbon, silicon or hydrogen present in R; X represents a substituent bonding to Si through halogen, oxygen or nitrogen present in X; n represents 1, 2 or 3; and a plurality of R substituents or X, if any, may be the same of different from each other.

10. The catalyst for polymerizing olefinic monomers of claim 7, wherein n is 1 or 2.

11. A method for producing olefinic polymers, which comprises:
    homopolymerizing or copolymerizing olefinic monomers in the presence of the catalyst as defined in claim 7.

12. A method for producing styrenic polymers, which comprises:
    homopolymerizing or copolymerizing styrenic monomers in the presence of the catalyst as defined in claim 7.

13. A catalyst for polymerizing olefinic monomers, which comprises:

(a) a transition metal compound represented by formula (4):

$$L_1L^2M^2X^1{}_pY^1{}_q \quad (4)$$

wherein $M^2$ represents a transition metal of Group VIII of the Periodic Table; $L^1$ and $L^2$ each represents a coordination-bonding ligand; $X^1$ and $Y^1$ each represents a covalent-bonding or ionic-bonding ligand; p+q equals the valence of $M^2$ minus 2; and $X^1$ and $Y^1$ may be bonded to each other to form a cyclic structure;

(b) at least one member selected from the group consisting of clay, clay minerals and ion-exchanging layered compounds; and (c) a silane compound.

14. The catalyst for polymerizing olefinic monomers of claim 13, further containing (d) an alkylating agent.

15. The catalyst for polymerizing olefinic monomers of claim 13, wherein the silane compound (c) is represented by the formula:

$$R_n SiX_{4-n}$$

wherein R represents a substituent bonding to Si through carbon, silicon or hydrogen present in R; X represents a substituent bonding to Si through halogen, oxygen or nitrogen present in X; n represents 1, 2 or 3; and a plurality of R substituents or X, if any, may be the same of different from each other.

16. The catalyst for polymerizing olefinic monomers of claim 15, wherein n is 1 or 2.

17. A method for producing olefinic polymers, which comprises:

homopolymerizing or copolymerizing olefinic monomers in the presence of the catalyst as defined in claim 13.

18. A method for producing styrenic polymers, which comprises:

homopolymerizing or copolymerizing styrenic monomers in the presence of the catalyst as defined in claim 13.

19. A catalyst for polymerizing olefinic monomers, which comprises:

(a) a transition metal compound represented by formula (4):

$$L^1 L^2 M^2 X^1_p Y^1_q \qquad (4)$$

wherein $M^2$ represents a transition metal of Group VIII of the Periodic Table; $L^1$ and $L^2$ each represents a coordination-bonding ligand; $X^1$ and $Y^1$ each represents a covalent-bonding or ionic-bonding ligand; p+q equals the valence of $M^2$ minus 2; and $X^1$ and $Y^1$ may be bonded to each other to form a cyclic structure;

(b) at least one member selected from the group consisting of clay, clay minerals and ion-exchanging layered compounds;

(c) a silane compound; and (e) an organic aluminum compound.

20. The catalyst for polymerizing olefinic monomers of claim 19, further containing (d) an alkylating agent.

21. The catalyst for polymerizing olefinic monomers of claim 19, wherein the silane compound (c) is represented by the formula:

$$R_n SiX_{4-n}$$

wherein R represents a substituent bonding to Si through carbon, silicon or hydrogen present in R; X represents a substituent bonding to Si through halogen, oxygen or nitrogen present in X; n represents 1, 2 or 3; and a plurality of R substituents or X, if any, may be the same of different from each other.

22. The catalyst for polymerizing olefinic monomers of claim 21, wherein n is 1 or 2.

23. A method for producing olefinic polymers, which comprises:

homopolymerizing or copolymerizing olefinic monomers in the presence of the catalyst as defined in claim 19.

24. A method for producing styrenic polymers, which comprises:

homopolymerizing or copolymerizing styrenic monomers in the presence of the catalyst as defined in claim 19.

* * * * *